United States Patent
Yu et al.

(10) Patent No.: US 10,945,183 B2
(45) Date of Patent: Mar. 9, 2021

(54) CELL OBTAINING METHOD, AND TERMINAL

(71) Applicant: Huawei Technologies Co., Ltd., Shenzhen (CN)

(72) Inventors: Yinghui Yu, Beijing (CN); Chenwan Li, Beijing (CN); Baokun Shan, Beijing (CN); Zhenglei Huang, Beijing (CN); Yan Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/273,693

(22) Filed: Feb. 12, 2019

(65) Prior Publication Data

US 2019/0174382 A1    Jun. 6, 2019

Related U.S. Application Data

(63) Continuation of application No. PCT/CN2016/094982, filed on Aug. 12, 2016.

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0027* (2013.01); *H04W 36/0088* (2013.01);
(Continued)

(58) Field of Classification Search
CPC ... H04W 36/04; H04W 36/28; H04W 36/369; H04W 76/27; H04W 36/0088; H04W 36/0027

See application file for complete search history.

(56) References Cited

U.S. PATENT DOCUMENTS

| 5,701,585 A | 12/1997 | Kallin et al. |
| 2009/0061878 A1* | 3/2009 | Fischer ................. H04W 28/06 455/436 |

(Continued)

FOREIGN PATENT DOCUMENTS

| CA | 2667098 A1 | 5/2008 |
| CN | 1175342 A | 3/1998 |

(Continued)

OTHER PUBLICATIONS

"Intra-RAT mobility for NB-IoT UE in RRC connected state," 3GPP TSG-SA WG2 #113, St. Kitts, KN, S2-160364, pp. 1-4, 3rd Generation Partnership Project, Valbonne, France (Jan. 25-29, 2016).

(Continued)

*Primary Examiner* — Chi Ho A Lee

(74) *Attorney, Agent, or Firm* — Leydig, Voit & Mayer, Ltd.

(57) ABSTRACT

Embodiments of this application provide a cell obtaining method and a terminal to reduce power consumption of the terminal. Technical solutions provided in the embodiments of this application are as follows: When a terminal is connected to a current source serving cell, the terminal obtains a first quality parameter of the current source serving cell; if the first quality parameter is less than a first preset threshold, the terminal determines a measurement cell set; the terminal measures each measurement cell in the measurement cell set to obtain each corresponding second quality parameter; and the terminal determines a target serving cell based on the second quality parameter.

18 Claims, 23 Drawing Sheets

(51) Int. Cl.
*H04W 36/02* (2009.01)
*H04W 76/27* (2018.01)
*H04W 36/04* (2009.01)
*H04W 36/28* (2009.01)
*H04W 36/36* (2009.01)
*H04W 36/08* (2009.01)

(52) U.S. Cl.
CPC ......... *H04W 36/023* (2013.01); *H04W 36/04* (2013.01); *H04W 36/28* (2013.01); *H04W 36/36* (2013.01); *H04W 76/27* (2018.02); *H04W 36/0061* (2013.01); *H04W 36/08* (2013.01); *Y02D 30/70* (2020.08)

(56) References Cited

U.S. PATENT DOCUMENTS

| | | | |
|---|---|---|---|
| 2009/0111503 A1 | 4/2009 | Pedersen et al. | |
| 2009/0190554 A1* | 7/2009 | Cho | H04L 1/1874 370/331 |
| 2009/0201881 A1 | 8/2009 | Chun et al. | |
| 2010/0254348 A1 | 10/2010 | Prakash et al. | |
| 2011/0149905 A1 | 6/2011 | Kim | |
| 2013/0183779 A1* | 7/2013 | Pachler | F21V 21/002 438/28 |
| 2013/0215822 A1 | 8/2013 | Worrall et al. | |
| 2014/0120916 A1* | 5/2014 | Du | H04W 36/28 455/436 |
| 2014/0334371 A1 | 11/2014 | Kim et al. | |
| 2015/0031366 A1* | 1/2015 | Lee | H04W 24/10 455/436 |
| 2015/0043422 A1* | 2/2015 | Fujishiro | H04B 7/15 370/315 |
| 2015/0289179 A1* | 10/2015 | Liu | H04W 48/20 370/331 |
| 2015/0289189 A1 | 10/2015 | Yang et al. | |
| 2016/0135072 A1* | 5/2016 | Wang | H04W 8/082 370/237 |
| 2017/0215224 A1* | 7/2017 | Ke | H04W 8/005 |
| 2017/0332356 A1* | 11/2017 | Tamura | H04W 68/00 |
| 2018/0242201 A1* | 8/2018 | Aminaka | H04W 36/00 |
| 2018/0295544 A1* | 10/2018 | Feng | H04W 36/08 |
| 2019/0222291 A1* | 7/2019 | Wang | H04B 7/005 |

FOREIGN PATENT DOCUMENTS

| | | |
|---|---|---|
| CN | 102056234 A | 5/2011 |
| CN | 102752842 A | 10/2012 |
| CN | 103326938 A | 9/2013 |
| CN | 103533586 A | 1/2014 |
| CN | 104488308 A | 4/2015 |
| CN | 104640165 A | 5/2015 |
| CN | 104981031 A | 10/2015 |
| EP | 2375815 A1 | 10/2011 |
| WO | 2015003126 A1 | 1/2015 |

OTHER PUBLICATIONS

"Support for RRC Connection Re-establishment," 3GPP TSG RAN WG2 NB-IOT AH, Budapest, Hungary, R2-160414, pp. 1-5, 3rd Generation Partnership Project, Valbonne, France (Jan. 19-21, 2016).
"Consideration on mobility enhancement in NB-IoT," 3GPP TSG-RAN WG2 #95, Gothenburg, Sweden, R2-164860, pp. 1-10, 3rd Generation Partnership Project, Valbonne, France (Aug. 22-26, 2016).
CN201680087888.4, Office Action/Search Report, dated Jul. 29, 2020.

* cited by examiner

CELL OBTAINING METHOD, AND TERMINAL

CROSS-REFERENCE TO RELATED APPLICATIONS

This application is a continuation of International Application No. PCT/CN2016/094982, filed on Aug. 12, 2016, the disclosure of which is hereby incorporated by reference in its entirety.

TECHNICAL FIELD

Embodiments of this application relate to the communications field, and in particular, to a cell obtaining method and a terminal.

BACKGROUND

Mobile communication has greatly changed people's life, but people are still in pursuit of mobile communication with better performance. To meet an explosive mobile data traffic growth, massive device connections, and continuous emergence of various new services and application scenarios in the future, the fifth generation (5G) mobile communications system emerges. As a part of 5G, the Internet of Things has seen rapid growth in market demands. Currently, the 3GPP standards organization is studying a cellular network-based IoT service by designing a new air interface and fully using a feature of a narrowband technology. This type of IoT is referred to as the Narrowband Internet of Things (NB-IoT). Requirements and features of the NB-IoT network, services, and terminals bring some new challenges to a design of a network architecture. The current Internet of Things mainly aims at a low-mobility terminal and application, and implements only a mobility function in an idle mode. However, a requirement of mobile Internet of Things is also an important requirement, and therefore, mobility in a connected mode needs to be resolved.

Currently, to implement mobility of the NB-IoT in the connected mode, a handover procedure of Long Term Evolution (LTE) is usually applied to the NB-IoT.

To implement a handover, in a system, a network side needs to perform measurement configuration, and further a terminal needs to perform measurement reporting. As a result, the terminal needs to perform measurement and measurement result reporting in a connected mode. To support handover decision-making, the UE usually reports a measurement report for more than one time, and consequently, power consumption of the terminal is relatively high.

SUMMARY

Embodiments of this application provide a cell obtaining method and a terminal to reduce power consumption of the terminal.

According to a first aspect, an embodiment of this application provides a cell obtaining method, including: when a terminal is connected to a current source serving cell, that is, the terminal exchanges data with a base station corresponding to the current source serving cell, obtaining, by the terminal, a first quality parameter of the current source serving cell in real time; if the first quality parameter is less than a first preset threshold, determining, by the terminal, a measurement cell set; then measuring, by the terminal, each measurement cell in the measurement cell set to obtain each corresponding second quality parameter; and finally determining, by the terminal, a target serving cell based on the second quality parameter.

In the technical solution provided in this embodiment of this application, the terminal determines the target serving cell by itself. This reduces a quantity of measurement reporting times in a connected mode, and further reduces power consumption of the terminal.

In a possible implementation, the measurement cell set includes at least one of: a cell whose quality parameter obtained by the terminal through measurement in an idle mode exceeds a preset value, a cell whose quality parameter obtained by the terminal through measurement in the idle mode ranks higher, a cell to which the terminal can be connected, a cell in a cell list in a broadcast message received by the terminal, and a cell related to frequency information in the broadcast message received by the terminal.

In the technical solution provided in this embodiment of this application, a selection range of measurement cells is centralized, so that a quantity of measurement times of the terminal is reduced, and power consumption of the terminal is reduced.

In a possible implementation, the terminal reports information about the target cell to a source base station corresponding to the current source serving cell by using an uplink direct transmission message. The information about the target cell may include an identity ID of the target serving cell or an index value of the target serving cell.

In a possible implementation, after the terminal reports, by using the uplink direct transmission message, the target cell to the source base station corresponding to the current source serving cell, the source base station may determine a target base station. Then, the source base station sends a handover request message to the target base station. The source base station receives a handover response message fed back by the target base station; and the terminal receives the information about the target cell that is sent by the source base station by using an RRC connection release message or a downlink direct transmission message. The terminal sends a cell change acknowledgment message to the target base station by using at least one of an RRC connection establishment complete message, an RRC reconfiguration complete message, and an uplink direct transmission message.

Based on the foregoing manner, when the terminal establishes a connection to the target base station, the terminal may indicate, by using corresponding signaling, a connection establishment cause to the target base station. The connection cause may be that the terminal reselects a cell, or that the terminal changes a cell, or that a connection between the terminal and a network is interrupted and needs to be restored. A specific cause is not limited herein. There may also be a plurality of types of signaling used by the terminal, which is not limited herein.

Based on the foregoing manner, when the terminal randomly accesses the target base station, the terminal may obtain configuration of a non-anchor carrier by using specific dedicated signaling or system broadcast. The dedicated signaling may be a message such as RRC connection reconfiguration or RRC connection release, and a system message may be a system message such as SIB1 or SIB2. A specific case is not limited herein. Configuration of a random access resource includes information such as duration of the random access resource, a start time of the random access resource, a carrier offset of the random access resource, a quantity of subcarriers of the random access resource, a subcarrier start location of a message 3 of the random access resource, a maximum quantity of preamble attempts, a repetition quantity of each preamble, a repetition quantity of an NPDCCH corresponding to a random access response, a start location of a downlink control channel search space corresponding to the random access response, and an offset of a downlink control channel corresponding to the random access response. The configuration of the non-anchor carrier is corresponding to control information of the random access response, and may include information such as the repetition quantity of the NPDCCH corresponding to the random access response, the start location of the downlink control channel search space corresponding to the random access response, and the offset of the downlink control channel corresponding to the random access response. A specific case is not limited herein.

According to a second aspect, an embodiment of this application provides a data processing method, including: obtaining, by a core network device, a first indication message used to indicate that a terminal completes a cell change or cell reselection; and then, sending, by the core network device, downlink data to a target base station connected to the terminal after the terminal completes a cell change or cell reselection.

In the technical solution provided in this embodiment of this application, after determining that the terminal completes cell reselection or a cell change, the core network device sends the downlink data to the target base station, so as to effectively ensure that the downlink data is not lost after the cell change or cell reselection, and further ensure continuity of the terminal in a mobile state.

In this embodiment of this application, the core network device may process data in the following several manners to implement no downlink data loss.

In a possible implementation, the core network device stores the downlink data sent to a source base station, and starts a first timer after storing the downlink data. The source base station is a base station connected to the terminal before the terminal completes a cell change or cell reselection. In this way, the core network device may obtain the first indication message before the first timer expires.

In the technical solution provided in this embodiment of this application, the core network device stores the downlink data sent to the source base station, and after the terminal establishes a connection to the target base station, sends the stored downlink data to the target base station, so as to effectively ensure that the downlink data is not lost, and further ensure continuity of the terminal in a mobile state.

Based on the foregoing manner, if the core network device still does not obtain the first indication message after the first timer expires, the core network device deletes the stored downlink data.

In the technical solution provided in this embodiment of this application, when the core network device does not obtain the first indication message, the core network device deletes the stored downlink data, so that storage burden can be effectively reduced.

Based on the foregoing manner, the core network device receives feedback information used to indicate a status of receiving the downlink data by the terminal. If the feedback information indicates that the terminal has completely received the downlink data, the core network device deletes the downlink data; or if the feedback information indicates that the terminal does not completely receive the downlink data, the core network device is triggered to send the downlink data to the target base station.

In the technical solution provided in this embodiment of this application, the core network device performs a specific operation based on a specific status of receiving the downlink data by the terminal, which helps reduce storage burden and improve work efficiency of the core network device.

Based on the foregoing manner, the first indication message obtained by the core network device may be a message such as an initial terminal context message initial UE message or a path switch path switch message.

In this embodiment of this application, the core network device may obtain the first indication message by using various types of signaling, and this can effectively improve compatibility and efficiency of the core network device.

In another possible implementation, before the core network device obtains the first indication message, the core network device receives indication signaling used to indicate that the terminal is about to reselect a cell or the terminal is about to change a cell. Then, the core network device stops sending the downlink data to the source base station, and starts a second timer, where the downlink data is downlink data sent by the core network device to the source base station. Then, the core network device obtains the first indication message before the second timer expires.

In the technical solution provided in this embodiment of this application, after receiving the indication signaling used to indicate that the terminal is about to reselect a cell or the terminal is about to change a cell, the core network device suspends the downlink data, and then sends the downlink data to the target base station after the terminal establishes a connection to the target base station, so as to effectively ensure that the downlink data is not lost, and further ensure continuity of the terminal in a mobile state.

Based on the foregoing manner, if the core network device still does not obtain the first indication message after the second timer expires, that is, the terminal may fail to connect to the target base station, the core network device starts to resume sending the downlink data to the source base station in this case.

In the technical solution provided in this embodiment of this application, the core network device may perform a specific operation based on a specific situation, and this helps improve working efficiency of the core network device.

Based on the foregoing manner, the first indication message may be uplink non-access stratum message transport UL NAS transport or another S1-AP message. This is not specifically limited herein.

In this embodiment of this application, the core network device may obtain the first indication message by using various types of signaling, and this can effectively improve compatibility and efficiency of the core network device.

In another possible implementation, before the core network device obtains the first indication message, the core network device receives indication signaling used to indicate that the terminal is about to reselect or change a cell. Then, the core network device starts to send the downlink data to the target base station, keeps sending the downlink data to the source base station, and starts a third timer, where the downlink data is downlink data sent by the core network device to the source base station. Then, the core network device obtains the first indication message before the third timer expires. Finally, if the core network device obtains the first indication message before the third timer expires, the core network device sends the downlink data to the target base station, and stops sending the downlink data to the source base station.

In the technical solution provided in this embodiment of this application, the core network device may send the downlink data to the source base station and the target base station at the same time, and this may effectively ensure that the downlink data is not lost, and further ensure continuity of the terminal in the mobile state.

Based on the foregoing manner, if the core network device still does not obtain the first indication message after the third timer expires, that is, the terminal may fail to connect to the target base station, the core network device stops sending the downlink data to the target base station.

In the technical solution provided in this embodiment of this application, the core network device may perform a specific operation based on a specific situation, and this helps improve working efficiency of the core network device.

Based on the foregoing manner, the first indication message is a UL NAS transport message or another S1-AP message.

In this embodiment of this application, the core network device may obtain the first indication message by using various types of signaling, and this can effectively improve compatibility and efficiency of the core network device.

In a possible implementation, the core network device may be a mobility management entity (MME).

In an actual application, the core network device may further be another physical apparatus, and a specific physical apparatus is not limited herein.

According to a third aspect, an embodiment of this application provides a data processing method, including: obtaining, by a source base station corresponding to a source serving cell in which a terminal is located before the terminal completes cell reselection or before the terminal completes a cell change, a second indication message used to indicate that the terminal starts to make a cell change or starts to reselect a cell; and then, sending, by the source base station, downlink data to a target base station corresponding to a target serving cell after the terminal completes cell reselection or a cell change, so that the target base station sends the downlink data to the terminal.

In this embodiment of this application, data transmission between the source base station and the target base station may effectively ensure that the downlink data is not lost, and further ensure continuity of the terminal in a mobile state.

In a possible design manner, when the second indication message indicates that the terminal completes cell reselection, the source base station receives a data transmission indication message or a radio link failure indication message sent by the target base station; then, the source base station sends a first request message to the target base station; and finally, the source base station receives a second response message fed back by the target base station as the second indication message. The first request message herein is a handover request message, and the first response message is a handover acknowledgment message. Both the first request message and the first response message may be X2-AP messages. If the first request message is a handover request message, there is an information element in the handover request to indicate whether there is downlink data to be sent to the target base station, and if there is downlink data to be sent to the target base station, after receiving the handover request message, the source base station sends the downlink data to the target base station. The downlink data is data for which the source base station does not receive a receiving acknowledgment, or may be data that is not sent. The first request message is a handover request message, and there may be an information element in the handover request to send the downlink data to the target base station. The downlink data is data for which the source base station does not receive a receiving acknowledgment, or may be data that is not sent.

Certainly, a second request message and the second response message may also be messages of another type. A specific case is not limited herein.

In a possible design manner, when the second indication message indicates that the terminal starts to make a cell change, the source base station sends a second request message to the target base station; and finally, the source base station receives a second response message fed back by the target base station as the second indication message. The second request message is a handover request message, and the second response message is a handover acknowledgment message. Both the second request message and the second response message may be X2-AP messages. If the second request message is a handover request message, there is an information element in the handover request to indicate whether there is downlink data to be sent to the target base station, and if there is downlink data to be sent to the target base station, after receiving the handover request message, the source base station sends the downlink data to the target base station. The downlink data is data for which the source base station does not receive a receiving acknowledgment, or may be data that is not sent. The second request message is a handover request message, and there may be an information element in the handover request to send the downlink data to the target base station. The downlink data is data for which the source base station does not receive a receiving acknowledgment, or may be data that is not sent.

Certainly, the second request message and the second response message may also be messages of another type. A specific case is not limited herein.

In the technical solution provided in this embodiment of this application, the source base station performs a specific operation based on a specific indication message, and this can effectively improve working efficiency of the source base station.

In a possible design manner, the source base station sends the downlink data to the target base station through an interconnection interface X2 between the base stations.

Certainly, before the source base station sends the downlink data to the target base station, the source base station receives the downlink data sent by the core network device. When data is transferred between the base stations, only the data is transferred, and signaling is not forwarded. Therefore, when sending NAS information to the base station, the core network device needs to indicate to the source base station whether data or signaling is sent.

In another possible implementation, the second indication message is an uplink direct transmission message UL information transfer or another radio resource control RRC message. A specific message form is not limited herein.

The foregoing describes only a scenario in which core network devices connected to the source base station and the target base station are a same core network device. In an actual application, the core network devices connected to the source base station and the target base station may be different. The following describes a scenario in which different core network devices coexist.

According to a fourth aspect, an embodiment of this application provides a data processing method, including: obtaining, by a source core network device, a third indication message used to indicate that a terminal is about to change a serving cell or a target core network device requests sending of downlink data, where the source core network device is a core network device connected to a source base station connected to the terminal before cell reselection or a cell change, and the target core network device is a core network device connected to a target base station connected to the terminal after cell reselection or a cell change; and then, sending, by the source core network device, the downlink data to the target core network device, so that the target core network device sends the downlink data to the target base station.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

In this embodiment of this application, the core network device may process data in the following several manners to implement that the downlink data is not lost.

In a possible implementation, the source core network device stores the downlink data and starts a first timer, where the downlink data is downlink data sent by the source core network device through the source base station. If the first timer expires and the source core network device does not obtain a first indication message, the source core network device deletes the downlink data; or if the first timer does not expire and the source core network device obtains the first indication message, the source core network device is triggered to send the downlink data to the target core network device.

In the technical solution provided in this embodiment of this application, after determining that the terminal is about to change the serving cell or the target core network device requests sending of the downlink data, the core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, when the first indication message indicates that the target core network device requests sending of the downlink data, the source core network device receives first request information that is sent by the target core network device and that is used to instruct the source core network device to create a data transmission channel. The first request information is sent by the target core network device after receiving the first indication message from the target base station connected to the target core network device. The first indication message is used to indicate that the target core network device needs to obtain the downlink data from the source core network device. Then, the source core network device sends a first response message for creating the data transmission channel to the target core network device. Finally, the source core network device sends the downlink data to the target core network device.

The first request information may be a create data forwarding tunnel request create data forwarding tunnel request, and the first response message may be a create data forwarding tunnel response create data forwarding tunnel response. A specific signaling form is not limited herein.

In the technical solution provided in this embodiment of this application, after determining that the terminal is about to change the serving cell or the target core network device requests sending of the downlink data, the core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, when the first indication message indicates that the target core network device requests sending of the downlink data, the source core network device receives second request information that is sent by the target core network device and that is used to instruct the source core network device to create a data transmission channel. The second request information is sent by the target core network device after receiving the first indication message. Then, the source core network device sends a second response message for creating the data transmission channel to the target core network device, where the second response message carries the downlink data.

The second request information may be a create data forwarding tunnel request create data forwarding tunnel request, and the second response message may be a create data forwarding tunnel response create data forwarding tunnel response. A specific signaling form is not limited herein.

In the technical solution provided in this embodiment of this application, after determining that the terminal is about to change the serving cell or the target core network device requests sending of the downlink data, the core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, when the first indication message indicates that the target core network device requests sending of the downlink data, the source core network device receives third request information that is sent by the target core network device and that is used to request the downlink data. The third request information is sent by the target core network device after receiving the first indication message. Then, the source core network device sends a third response message to the target core network device, where the third response message carries the downlink data.

The third request information may be a context and data request context and data request, and the third response message may be a context and data response context and data response. A specific signaling form is not limited herein.

In the technical solution provided in this embodiment of this application, after determining that the terminal is about to change the serving cell or the target core network device requests sending of the downlink data, the core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, when the first indication message indicates that the terminal makes a cell change, the source core network device receives a handover request sent by the source base station connected to the source core network device, where the handover request includes information about the target core network device. Then, the source core network device sends a data allocation request to the target core network device based on the information about the target core network device. Next, the source core network device receives a data allocation response fed back by the target core network device as the first indication message, and the data allocation response is sent after the target core network device receives a handover response fed back by the target base station. Next, the source core network device sends, to the target core network device, fourth request information used to instruct the target core network device to create a data transmission channel. Next, the source core network device receives a fourth response message that is for creating the data transmission channel and that is fed back by the target core network device. Finally, the source core network device sends the downlink data to the target core network device.

The data allocation request may be a forward reallocation request forward reallocation request, the data allocation response may be a forward relocation response, the fourth request information may be a create indirect data forwarding tunnel request create indirect data forwarding tunnel request, and the fourth response message may be a create indirect data forwarding tunnel response create indirect data forwarding tunnel response. A specific signaling form is not limited herein.

In the technical solution provided in this embodiment of this application, after determining that the terminal is about to change the serving cell or the target core network device requests sending of the downlink data, the core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, when the first indication message indicates that the terminal makes a cell change, the source core network device receives a handover request sent by the source base station connected to the source core network device, where the handover request includes information about the target core network device. Then, the source core network device sends a data allocation request to the target core network device based on the information about the target core network device. Next, the source core network device receives a data allocation response fed back by the target core network device as the first indication message, and the data allocation response is sent after the target core network device receives a handover response fed back by the target base station. Next, the source core network device receives fifth request information sent by the target core network device, where the fifth request information is used to request the downlink data. Finally, the source core network device sends a fifth response message to the target core network device, where the fifth response message carries the downlink data.

The data allocation request may be a forward reallocation request forward reallocation request, the data allocation response may be a forward reallocationn response, the fifth request information may be a context and data request context and data request, and the fifth response message may be a context and data response context and data response. A specific signaling form is not limited herein.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, the source core network device may further receive feedback information used to indicate a status of receiving the downlink data by the terminal. If the feedback information indicates that the terminal has completely received the downlink data, the source core network device deletes the downlink data; or if the feedback information indicates that the terminal does not completely receive the downlink data, the source core network device is triggered to send the downlink data to the target core network device.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

In another implementation, the source core network device receives indication signaling used to indicate that the terminal is about to reselect or change a cell. Then, the source core network device stops sending the downlink data to the source base station, and starts a second timer. Finally, the source core network device obtains the first indication message before the second timer expires.

The indication signaling is an uplink non-access stratum transport message UL NAS transport or another uplink message between the base station and the core network. A specific signaling form is not limited herein.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, if the second timer expires and the source core network device does not obtain the first indication message, the source core network device sends the downlink data to the source base station.

Based on the foregoing manner, the source core network device receives sixth request information that is sent by the target core network device and that is used to instruct the source core network device to create a data transmission channel, where the sixth request information is sent after the target core network device receives second indication message from the target base station, and the second indication message is used to indicate that the terminal completes cell reselection or the terminal completes a cell change, and the target core network device needs to obtain the downlink data from the source core network device. Then, the source core network device sends a sixth response message for creating the data transmission channel to the target core network device. Finally, the source core network device sends the downlink data to the target core network device.

The sixth request information may be a create indirect data forwarding tunnel request create indirect data forwarding tunnel request, and the sixth response message may be a create indirect data forwarding tunnel response create indirect data forwarding tunnel response. A specific signaling form is not limited herein.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Based on the foregoing manner, the source core network device receives seventh request information that is sent by the target core network device and that is used to request the downlink data from the source core network device, where the seventh request information is sent by the target core network device after receiving the second indication message. Then, the source core network device sends a seventh response message for creating a data transmission channel to the target core network device, where the seventh response message carries the downlink data.

The seventh request information may be a context and data request context and data request, and the seventh response message may be a context and data response context and data response.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

In another possible implementation, after the source core network device receives the indication signaling used to indicate that the terminal is about to reselect or change a cell, the source core network device starts to send the downlink data to the terminal through the target base station, starts to send the downlink data to the terminal through the source base station, and starts a third timer. If the source core network device obtains the first indication message before the third timer expires, the source core network device stops sending the downlink data to the terminal through the source base station; or if the source core network device does not obtain the first indication message after the third timer expires, the source core network device stops sending the downlink data to the terminal through the target base station.

In the technical solution provided in this embodiment of this application, after determining that the terminal is about to change the serving cell or the target core network device requests sending of the downlink data, the source core network device sends the downlink data to the target core network device. Then, the target core network device sends the downlink data to the target base station, so as to effectively ensure that the downlink data is not lost after the cell change or cell reselection, and further ensure continuity of the terminal in a mobile state.

Both the source core network device and the target core network device may be mobile MMEs. In an actual application, the source core network device and the target core network device may be other physical apparatuses, and specific physical apparatuses are not limited herein.

According to a fifth aspect, an embodiment of this application provides a data processing method, including: obtaining, by a source base station corresponding to a source serving cell in which the terminal is located before the terminal reselects or changes a cell, a second indication message used to indicate that the terminal makes a cell change or completes cell reselection; and sending, by the source base station, downlink data to a target base station corresponding to a target serving cell after the terminal completes cell reselection or a cell change, so that the target base station sends the downlink data to the terminal.

In this embodiment of this application, data transmission between the source base station and the target base station may effectively ensure that the downlink data is not lost, and further ensure continuity of the terminal in a mobile state.

In a possible design manner, when the second indication message indicates that the terminal completes cell reselection, the source base station receives a cell reselection or cell change indication message or a radio link failure indication message sent by the target base station; then, the source base station sends a first request message to the target base station; and finally, the source base station receives a first response message fed back by the target base station as the second indication message. The first request message herein is a handover request message, and the first response message is a handover acknowledgment message. Both the first request message and the first response message may be X2-AP messages. If the first request message is a handover request message, there is an information element in the handover request to indicate whether there is downlink data to be sent to the target base station, and if there is downlink data to be sent to the target base station, after receiving a handover acknowledgment message, the source base station sends the downlink data to the target base station. The downlink data is data for which the source base station does not receive a receiving acknowledgment, or may be data that is not sent. The first request message is a handover request message, and there may be an information element in the handover request to send the downlink data to the target base station. The downlink data is data for which the source base station does not receive a receiving acknowledgment, or may be data that is not sent.

Certainly, a second request message and the second response message may also be messages of another type. A specific case is not limited herein.

In a possible design manner, when the second indication message indicates that the terminal starts to make a cell change, the source base station sends a second request message to the target base station; and finally, the source base station receives a second response message fed back by the target base station as the second indication message. The second request message is a handover request message, and the second response message is a handover acknowledgment message. The second request message herein is a handover request message, and the second response message is a handover acknowledgment message. Both the second request message and the second response message may be X2-AP messages. If the second request message is a handover request message, there is an information element in the handover request to indicate whether there is downlink data to be sent to the target base station, and if there is downlink data to be sent to the target base station, after receiving the handover request message, the source base station sends the downlink data to the target base station. The downlink data is data for which the source base station does not receive a receiving acknowledgment, or may be data that is not sent. The second request message is a handover request message, and there may be an information element in the handover request to send the downlink data to the target base station. The downlink data is data for which the source base station does not receive a receiving acknowledgment, or may be data that is not sent.

Certainly, the second request message and the second response message may also be messages of another type. A specific case is not limited herein.

In the technical solution provided in this embodiment of this application, the source base station performs a specific operation based on a specific indication message, and this can effectively improve working efficiency of the source base station.

In a possible design manner, the source base station sends the downlink data to the target base station through an interconnection interface X2 between the base stations.

Certainly, before the source base station sends the downlink data to the target base station, the source base station receives the downlink data sent by the core network device. When data is transferred between the base stations, only the data is transferred, and signaling is not forwarded. Therefore, when sending NAS information to the base station, the core network device needs to indicate to the source base station whether data or signaling is sent.

In another possible implementation, the second indication message is an uplink direct transmission message UL information transfer or another radio resource control RRC message. A specific message form is not limited herein.

According to a sixth aspect, an embodiment of this application provides a terminal, and the terminal has a function of implementing the terminal in the foregoing method. The function may be implemented by hardware, or may be implemented by hardware by executing corresponding software. The hardware or the software includes one or more modules corresponding to the foregoing function.

In a possible implementation, the terminal includes:

a processing module, configured to: when the terminal is connected to a current source serving cell, obtain a first quality parameter of the current source serving cell; if the first quality parameter is less than a first preset threshold, determine a measurement cell set; measure each measurement cell in the measurement cell set to obtain each corresponding second quality parameter; and determine a target serving cell based on the second quality parameter.

In another possible implementation, the terminal includes:

a transceiver, a processor, and a bus, where the transceiver is connected to the processor by using the bus; and the processor performs the following steps: when the terminal is connected to a current source serving cell, obtaining a first quality parameter of the current source serving cell; if the first quality parameter is less than a first preset threshold, determining a measurement cell set; measuring each measurement cell in the measurement cell set to obtain each corresponding second quality parameter; and determining a target serving cell based on the second quality parameter.

According to a seventh aspect, an embodiment of this application provides a computer storage medium, the computer storage medium stores program code, and the program code is used for instructing to execute the method in the foregoing first aspect.

It can be learned from the foregoing technical solutions that the embodiments of this application have the following advantages: If the terminal is connected to the current source serving cell, and the terminal learns that the first quality parameter of the current source serving cell is less than the first preset threshold, the terminal may measure the measurement cell to determine the target serving cell, and does not report a measurement report repeatedly to the base station for determining the target serving cell, thereby reducing a quantity of reporting times and further reducing power consumption of the terminal.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by persons skilled in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the terms used in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 1:
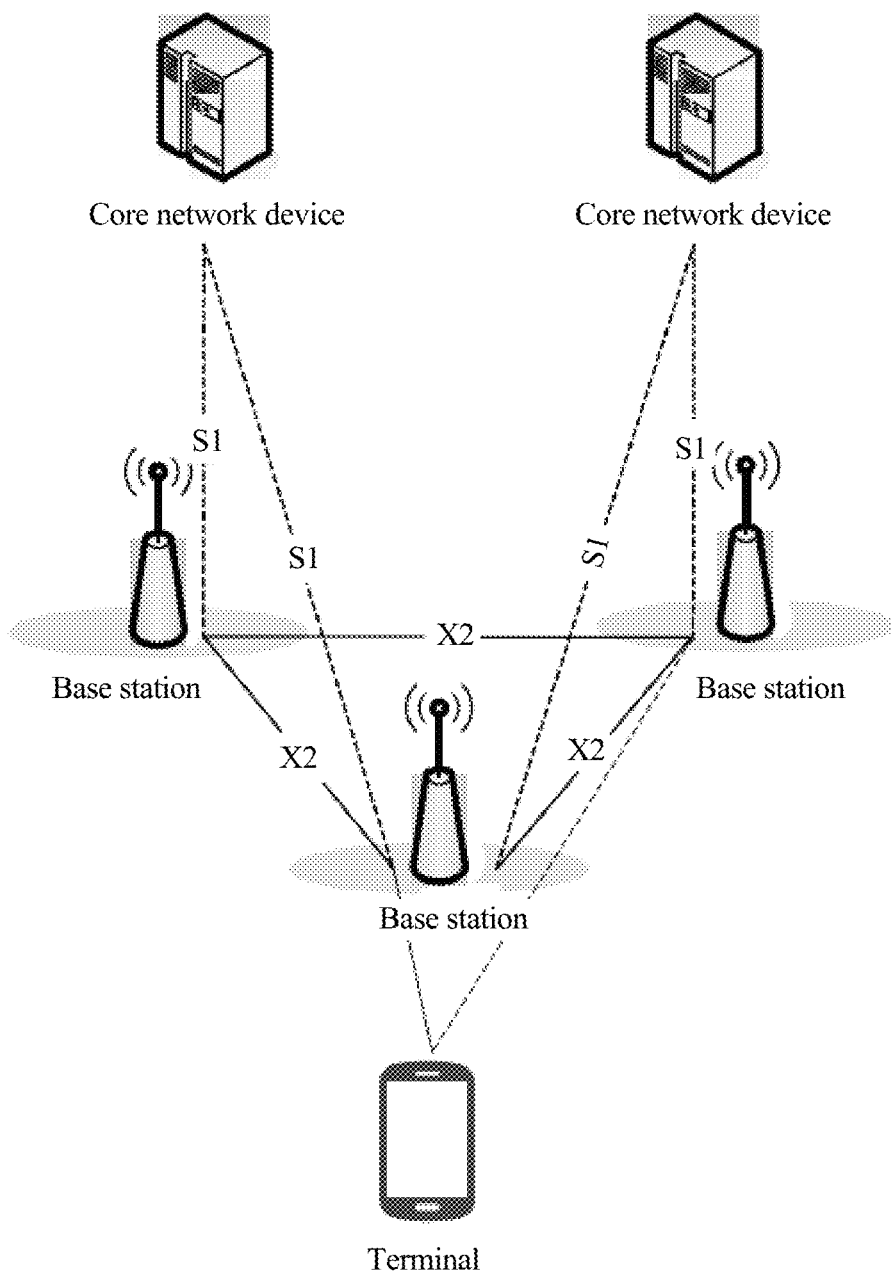
FIG. 1 is a schematic diagram of a framework of a network system according to an embodiment of this application.

A network system shown in FIG. 1 includes a base station, a terminal, and a core network device. The network system may include a plurality of base stations, a plurality of core network devices, and a plurality of terminals. The base station and the core network device transfer data through an S1 interface, one base station and another base station transfer data through an X2 interface, and the terminal transfers data with the core network device through the base station. The terminal may reselect a cell in an idle mode or may change a cell in a connected mode. In both cases, the terminal no longer exchanges data with a core network through a base station corresponding to a source serving cell. Instead, the terminal exchanges data with the core network through a base station corresponding to a target serving cell.

Currently, the 3GPP standards organization is studying a cellular network-based IoT service by designing a new air interface and fully using a feature of a narrowband technology. This type of IoT is referred to as the Narrowband Internet of Things. The NB-IoT mainly aims at a low-mobility terminal and application, and implements only a mobility function in an idle mode. However, a requirement of mobile Internet of Things is also an important requirement, and therefore, mobility in a connected mode needs to be resolved. Currently, to implement mobility of the NB-IoT in the connected mode, an LTE handover procedure is usually applied to the NB-IoT. However, because the NB-IoT does not include a Packet Data Convergence Protocol layer (PDCP), the NB-IoT cannot transmit data on a control plane, and further, after the terminal accesses a target base station, the terminal cannot completely receive downlink data that is not completed before a handover.

To resolve this problem, the embodiments of this application provide the following technical solution: A core network device obtains a first indication message that is used to indicate that a terminal completes a cell change or the terminal completes cell reselection; and the core network device sends downlink data to the terminal through a target base station connected to the terminal after the terminal completes the cell change or cell reselection.

Specifically, refer to the following several embodiments. FIG. 2 to FIG. 12 are data processing methods used when the terminal reselects a cell, and FIG. 13 to FIG. 22 are data processing methods used when the terminal makes a cell change.

Figure 2:
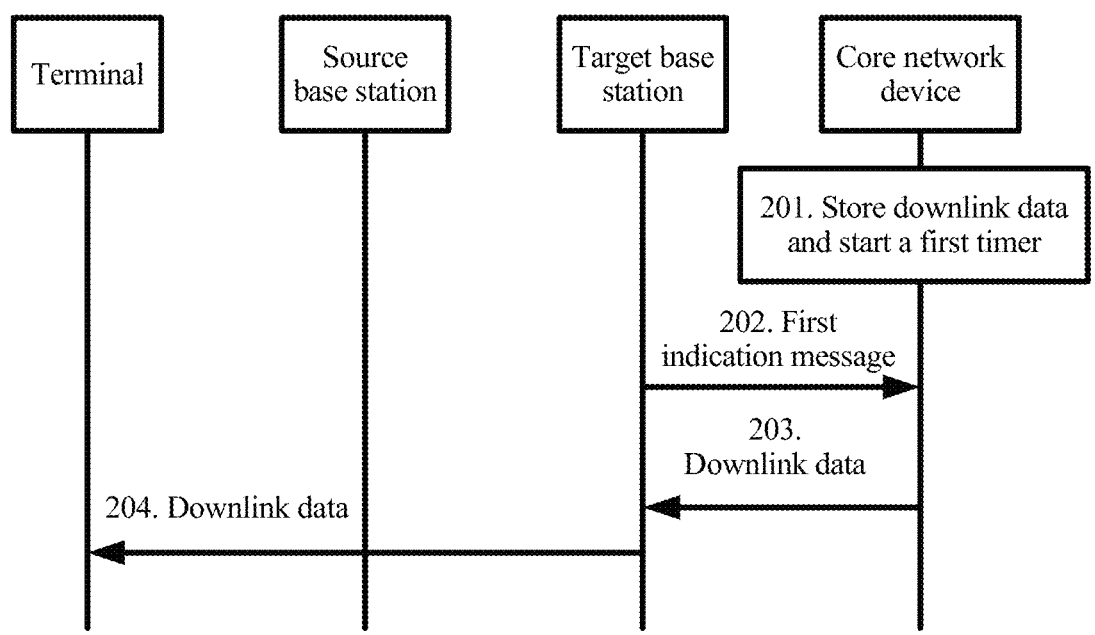
FIG. 2 is a schematic diagram of an embodiment of a data processing method according to an embodiment of this application.

Specifically, referring to FIG. 2, in this embodiment, a terminal reselects a cell, and a core network device transfers data. A source base station and a target base station share one core network device.

201. The core network device stores downlink data and starts a first timer.

When sending the downlink data to the source base station, the core network device stores the sent downlink data and starts the first timer.

In this embodiment, running duration of the first timer is preconfigured, and specific duration is not limited herein. The core network device may be an MME, or may be another core network device, such as an SGW. A specific form is not limited herein, provided that the core network device can effectively ensure that data is not lost. In this embodiment, the MME is used as an example. The duration of the first timer is 10 seconds. The downlink data sent by the MME to the source base station is a data packet 1, a data packet 2, a data packet 3, a data packet 4, and a data packet 5. The MME stores the five data packets and starts the first timer. Certainly, the MME may start a timer 1 after sending the data packet 1, start a timer 2 after sending the data packet 2, and so on. Values of these timers may be the same or may be different. In addition, the MME may alternatively start one timer after sending the five packets. A specific use form is not limited.

202. The target base station sends a first indication message to the core network device, where the first indication message is used to indicate that the terminal completes cell reselection.

After the terminal reselects a cell, and the terminal is successfully connected to the target base station, the target base station sends the first indication message to the core network device, to notify the core network device that the terminal has completed cell reselection.

In this embodiment, if the terminal needs to be connected to the target base station, in information such as an RRC connection establishment request or an RRC connection re-establishment request, the terminal may further add a cause of connecting the terminal to the target base station. For example, it may be indicated that a cause of currently establishing a connection is cell reselection, or it may be indicated that a cause of currently establishing a connection is a network disconnection, and data needs to be reconnected, or it may be indicated that a cause of currently establishing a connection is a cell change. A specific cause is not limited herein. Specifically, there are two data transmission solutions in NB-IoT: One is based on control plane transmission, and the other is based on user plane transmission. For the control plane solution, when establishing a connection to the target base station, the terminal may initiate an RRC connection establishment request that carries a cell reselection or another cause value. After receiving the connection establishment request, the base station sends an RRC connection establishment message to the terminal, and the terminal returns an RRC connection establishment complete message to the base station.

In the solution in which data is transmitted by using the user plane, the terminal may send an RRC connection re-establishment request to carry a cell reselection or another cause value. After receiving the connection establishment request, the base station sends an RRC connection re-establishment message to the terminal, and the terminal returns an RRC connection re-establishment complete message to the base station.

After establishing an RRC connection to the terminal, the base station sends an initial UE message or a path switch message to the core network device, where the message also carries a cause value of establishing the connection by the terminal. Then, a core network learns of a specific cause of establishing the connection.

Specifically, in the control plane transmission solution, if a radio link failure occurs, and the terminal still has a downlink acknowledgment message to be received from the core network device, the terminal may notify a NAS stratum, and the NAS stratum decides to resume the connection. The terminal sends an RRC connection establishment request to the target base station, and the RRC connection establishment request carries a cause value, indicating that currently establishing the connection is because an acknowledgment message or another cause needs to be received from a core network side. The target base station may send the message to the core network by using an initial UE message. Therefore, the core network knows the cause of establishing the connection.

Alternatively, in this scenario, the cause value carried in the RRC connection establishment request sent by the terminal is MT, and when the terminal sends the RRC connection establishment request, one information element is added to a service request message, indicating a cause of establishing the connection. Further, the cause is sent to the core network by the base station by using the initial UE message. Therefore, the core network knows the cause of establishing the connection.

Alternatively, in this scenario, the terminal initiates a tracking area update procedure.

In addition, in an actual application, when the terminal randomly accesses the target base station, the terminal may obtain configuration of a non-anchor carrier by using specific dedicated signaling or system broadcast. The dedicated signaling may be a message such as RRC connection reconfiguration or RRC connection release, and a system message may be a system message such as SIB1 or SIB2. A specific case is not limited herein. Configuration of a random access resource includes information such as duration of the random access resource, a start time of the random access resource, a carrier offset of the random access resource, a quantity of subcarriers of the random access resource, a subcarrier start location of a message 3 of the random access resource, a maximum quantity of preamble attempts, a repetition quantity of each preamble, a repetition quantity of an NPDCCH corresponding to a random access response, a start location of a downlink control channel search space corresponding to the random access response, and an offset of a downlink control channel corresponding to the random access response. The configuration of the non-anchor carrier is corresponding to control information of the random access response, and may include information such as the repetition quantity of the NPDCCH corresponding to the random access response, the start location of the downlink control channel search space corresponding to the random access response, and the offset of the downlink control channel corresponding to the random access response. A specific case is not limited herein.

In this embodiment, the first indication message may be a message such as an initial UE message or a path switch message that is sent by the target base station to the core network device. A specific message form is not limited herein.

In this embodiment, if the target base station does not send the first indication message to the core network device after the first timer expires, it indicates that the terminal fails to connect to the target base station, or the terminal does not reselect a cell in a running period of the first timer, and the core network device may delete the stored downlink data. For example, if 10 seconds later after the MME stores the five data packets, the MME does not receive a message that is sent by the target base station and that indicates that the terminal has completed cell reselection, the MME deletes the five data packets.

203. The core network device sends the downlink data to the target base station.

The core network device sends the stored downlink data to the target base station.

In this embodiment, in a process of establishing a connection by the terminal to the target base station, the terminal may further feed back a status of receiving the downlink data. The terminal may feed back, in the following manner, the status of receiving the downlink data. For example, if the terminal has not completely received the downlink data, the terminal sends feedback information. If the terminal has completely received the downlink data, the terminal does not send the feedback information. Certainly, on the contrary, if the terminal has not completely received the downlink data, the terminal does not send the feedback information. If the terminal has completely received the downlink data, the terminal sends the feedback information. The feedback information may be carried in RRC connection establishment request signaling or RRC connection establishment complete signaling. After the target base station receives the feedback information, the target base station may further add the feedback information to initial terminal information initial UE message or a data path switch path switch message that is sent to the core network device, that is, to notify the core network device that the terminal has completely received the downlink data or the terminal has not completely received the downlink data. If the feedback information indicates that the terminal has completely received the downlink data, the core network device may delete the downlink data. If the feedback information indicates that the terminal has not completely received the downlink data, the core network device sends the downlink data to the terminal again through the target base station. A specific feedback manner and feedback information sending manner are not limited herein.

In this embodiment, the terminal may determine whether the terminal receives the five data packets. If the terminal completely receives the five data packets: the data packet 1, the data packet 2, the data packet 3, the data packet 4, and the data packet 5, the terminal may feed back, to the core network device through the target base station, that the terminal has completely received the five data packets. In this case, the core network device does not need to send the five data packets to the terminal again through the target base station. If the terminal determines that the terminal receives only three data packets: the data packet 1, the data packet 2, and the data packet 3, the terminal may feed back, to the core network device through the target base station, that the terminal does not completely receive the five data packets. In this case, the terminal may delete the received data packet 1, data packet 2, and data packet 3, and then re-receive the five data packets: the data packet 1, the data packet 2, the data packet 3, the data packet 4, and the data packet 5 that are sent by the core network device to the terminal through the target base station. If the terminal determines that the terminal receives only three data packets: the data packet 1, the data packet 2, and the data packet 3, the terminal may feed back sequence numbers or index values of the received data packets to the core network device. The core network device may delete the first three stored packets, and send the fourth packet and the fifth packet through the target base station. If the core network device sends only one data packet, and the terminal does not completely receive the data packet, the terminal sends a feedback to the network side, and deletes the NAS packet that is not received completely, and the MME sends the NAS packet again through the target base station. Specifically, the UE receives the NAS packet and may learn, based on a sequence number of each piece of data, which packet is received, and may feed back the sequence number of the packet, or may feed back how many NAS packets are received in the current connection. A specific form is not limited.

204. The target base station sends the downlink data to the terminal.

The target base station forwards the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received. In addition, when sending the uplink data, the terminal may further indicate whether the uplink data is NAS signaling or NAS data. In addition, when sending data, the terminal may further send a NAS count of an uplink data packet. If a case such as cell reselection, a cell handover, or a cell change occurs, the base station may forward a correctly received but an out-of-order data packet and sequence number to the target base station, and the terminal may send, to the target base station, a NAS packet corresponding to a NAS count value that is not acknowledged for receiving.

In this embodiment, the core network device stores the downlink data for the terminal. Then, after the terminal is handed over from the source base station to the target base station, the core network device sends the stored downlink data to the terminal. In this way, it can be ensured that no downlink data is lost in a reselection process, and data continuity is further ensured.

Figure 3:
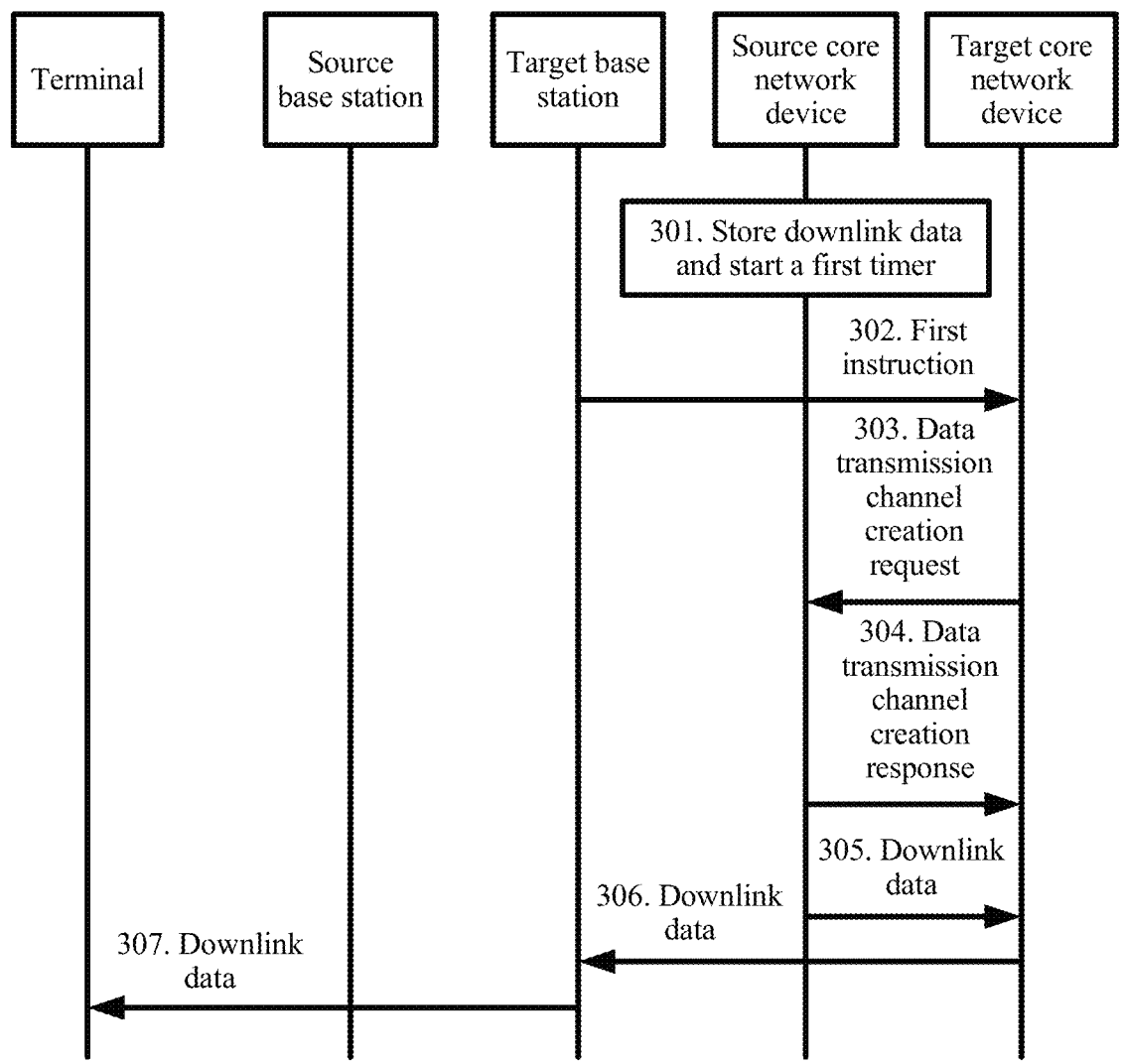
FIG. 3 is a schematic diagram of another embodiment of a data processing method according to an embodiment of this application.

Specifically, referring to FIG. 3, in this embodiment, the terminal reselects a cell, and a core network device transfers data. A source base station and a target base station are connected to different core network devices.

301. A source core network device stores downlink data and starts a first timer.

When sending the downlink data to the terminal through the source base station, the source core network device stores the sent downlink data and starts the first timer.

In this embodiment, running duration of the first timer is preconfigured, and specific duration is not limited herein. The core network device may be an MME, or may be another core network device, such as an SGW. A specific form is not limited herein, provided that the core network device can effectively ensure that data is not lost. In this embodiment, the MME is used as an example. The duration of the first timer is 10 seconds. Before cell reselection, the downlink data sent by the source MME to the source base station is a data packet 1, a data packet 2, a data packet 3, a data packet 4, and a data packet 5. The MME stores the five data packets and starts the first timer.

302. The target base station sends a first instruction to a target core network device.

When the terminal establishes a connection to the target base station, content such as information about the source base station and information about the source core network device, for example a GUTI, is carried in a message such as an RRC connection establishment request, an RRC connection re-establishment request, an RRC connection establishment complete message, and an RRC re-establishment complete message. The target base station forwards the content that carries related information to the target core network device. A message sent by the target base station to the target core network device may be considered as the first instruction, and the instruction may indicate whether a core network is to obtain data. If data needs to be obtained, the instruction indicates that the target core network device needs to request the downlink data from the source core network device.

In this embodiment, the target base station may send an initial UE message to the target core network device. In addition, the initial UE message carries a field or an information element that is used to indicate that the target core network device needs to request the downlink data from the source core network device. In this case, the initial UE message can be used as the first instruction. For example, in this embodiment, the target base station may send an initial UE message to the target MME, and add a field 1100 to the initial UE message, where the field 1100 is used to indicate that the target MME needs to request the five data packets: the data packet 1, the data packet 2, the data packet 3, the data packet 4, and the data packet 5 from the source MME.

303. The target core network device sends a data transmission channel creation request to the source core network device.

The target core network device sends the data transmission channel creation request to the source core network device.

In this embodiment, the data transmission channel creation request may be a create data forwarding tunnel request. Specific signaling is not limited herein.

304. The source core network device sends a data transmission channel creation response to the target core network device.

After the source core network device receives the data transmission channel creation request sent by the target core network device, the source core network device feeds back a data transmission channel creation response to the target core network device, so as to indicate that the source core network device agrees to establish the data transmission channel.

In this embodiment, the data transmission channel creation response may be a create data forwarding tunnel response. Specific signaling is not limited herein.

305. The source core network device sends the downlink data to the target core network device.

After establishing the data transmission channel, the source core network device sends the downlink data to the target core network device. For example, the source MME sends the five data packets: the data packet 1, the data packet 2, the data packet 3, the data packet 4, and the data packet 5 to the target MME.

306. The target core network device sends the downlink data to the target base station.

After receiving the downlink data sent by the source core network device, the target core network device forwards the downlink data to the target base station. For example, in this embodiment, the target MME sends the five data packets: the data packet 1, the data packet 2, the data packet 3, the data packet 4, and the data packet 5 to the target base station.

307. The target base station sends the downlink data to the terminal.

After the target base station receives the downlink data sent by the target core network device, the target base station sends the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially and continuously received.

In this embodiment, the source core network device stores the downlink data for the terminal. Then, after the terminal is handed over from the source base station to the target base station, the source core network device sends the stored downlink data to the target core network device, and then the downlink data is sent to the terminal through the target base station. In this way, it can be ensured that no downlink data is lost in a reselection process, and data continuity is further ensured.

Figure 4:
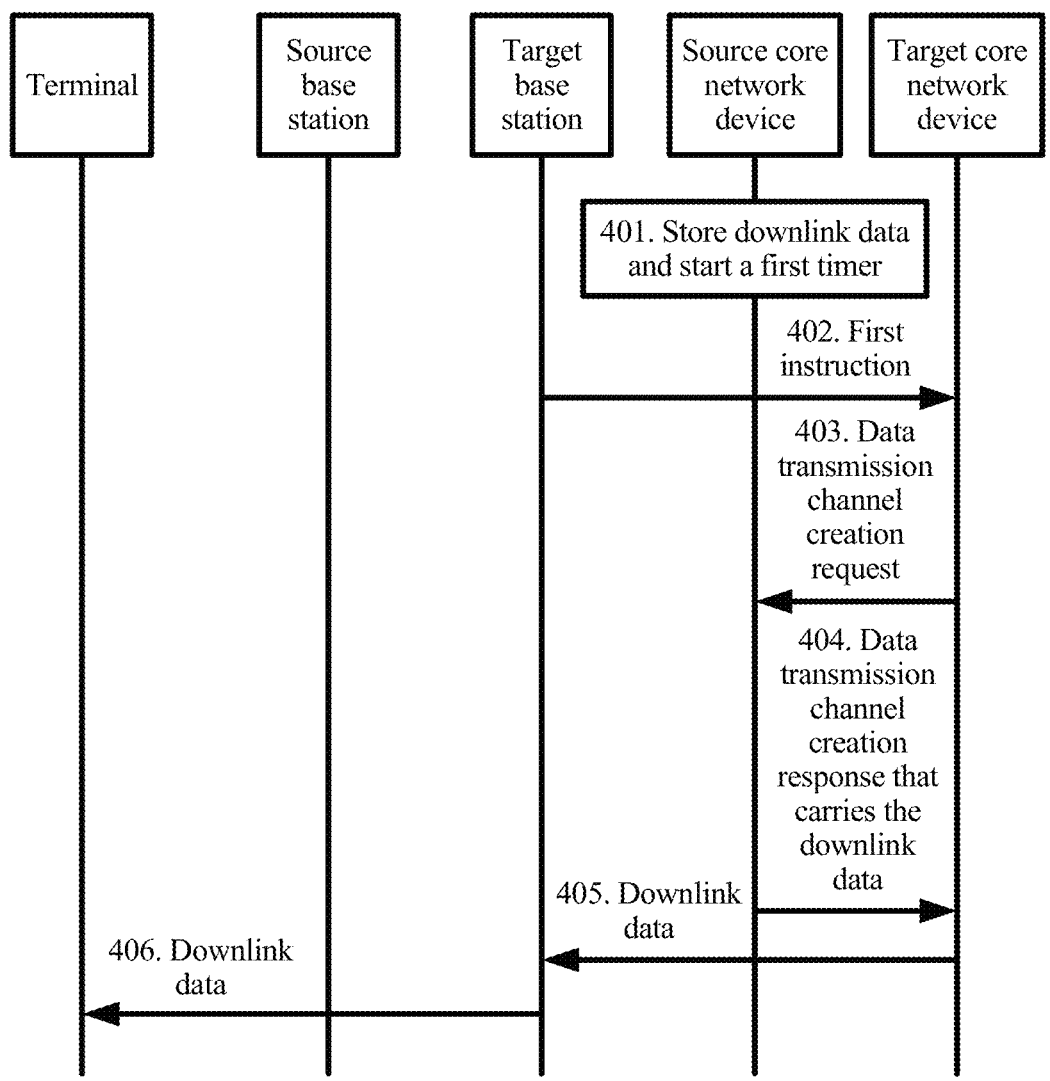
FIG. 4 is a schematic diagram of another embodiment of a data processing method according to an embodiment of this application.

Specifically, referring to FIG. 4, in this embodiment, the terminal reselects a cell, and a core network device transfers data. A source base station and a target base station are connected to different core network devices.

Step 401 to step 403 are the same as step 301 to step 303, and details are not described herein again.

404. A source core network device sends a data transmission channel creation response that carries downlink data to a target core network device.

After the source core network device receives a data transmission channel creation request sent by the target core network device, the source core network device feeds back a data transmission channel creation response to the target core network device, so as to indicate that the source core network device agrees to establish the data transmission channel; and adds the downlink data to the data transmission channel creation response.

In this embodiment, the data transmission channel creation response may be a create data forwarding tunnel response. Specific signaling is not limited herein.

Step 405 and step 406 are the same as step 306 and step 307, and details are not described herein again.

In this embodiment, the source core network device stores the downlink data for the terminal. Then, after the terminal is handed over from the source base station to the target base station, the source core network device sends the stored downlink data to the target core network device, and then the downlink data is sent to the terminal through the target base station. In this way, it can be ensured that no downlink data is lost in a reselection process, and data continuity is further ensured.

Figure 5:
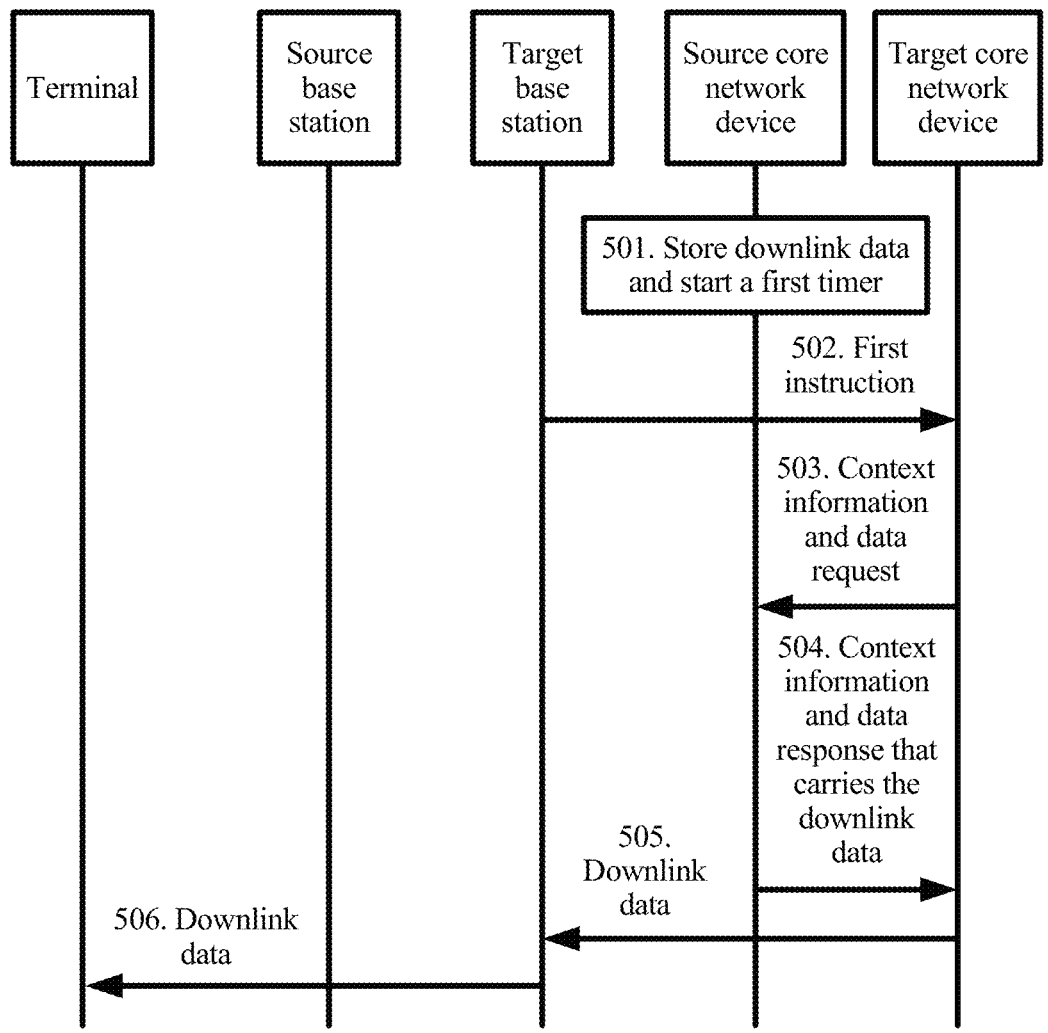
FIG. 5 is a schematic diagram of another embodiment of a data processing method according to an embodiment of this application.

Specifically, referring to FIG. 5, in this embodiment, the terminal reselects a cell, and a core network device transfers data. A source base station and a target base station are connected to different core network devices.

Step 501 and step 502 are the same as step 301 and step 302, and details are not described herein again.

503. A target core network device sends a context information and data request to a source core network device.

After the target core network device receives a first instruction that is sent by the target base station and that is used to indicate that the target core network device needs to request the downlink data from the source core network device, the target core network device may directly send a context information and data request message to the source core network device.

In this embodiment, the context information and data request message may be a context and data request. Specific signaling is not limited herein.

504. The source core network device sends a context information and data response that carries downlink data to the target core network device.

After the source core network device receives the context information and data request message sent by the target core network device, the source core network device feeds back the context information and data response to the target core network device, so as to indicate that the source core network device agrees to send the context information and the downlink data; and adds the downlink data and the context information to the context information and data response.

In this embodiment, the context information and data response may be a context and data response. Specific signaling is not limited herein.

Step 505 and step 506 are the same as step 306 and step 307, and details are not described herein again.

In this embodiment, the source core network device stores the downlink data for the terminal. Then, after the terminal is handed over from the source base station to the target base station, the source core network device sends the stored downlink data to the target core network device, and then the downlink data is sent to the terminal through the target base station. In this way, it can be ensured that no downlink data is lost in a reselection process, and data continuity is further ensured.

Figure 6:
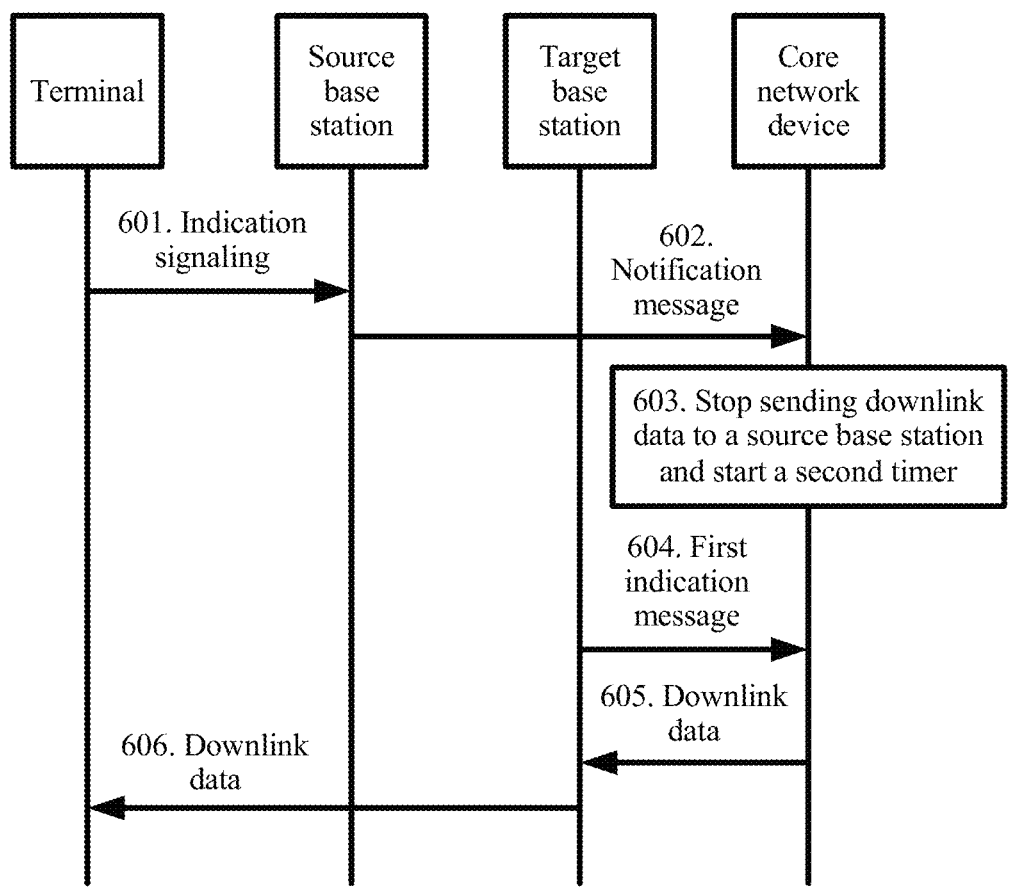
FIG. 6 is a schematic diagram of another embodiment of a data processing method according to an embodiment of this application.

Specifically, referring to FIG. 6, in this embodiment, the terminal reselects a cell, and a core network device transfers data. A source base station and a target base station are connected to a same core network device.

601. The terminal sends indication signaling to the source base station, where the indication signaling is used to indicate that the terminal is about to reselects a cell.

Before reselecting a cell, the terminal sends the indication signaling to the source base station, where the indication signaling is used to notify the source base station that the terminal is about to reselect a cell.

In this embodiment, the indication signaling carries information such as a cell reselection indication, an S-TMSI, and the target base station. The information may be appended to an RRC message, such as an RRC connection establishment request or an RRC connection re-establishment request. The information may alternatively be attached to a NAS message, such as UL information transfer. An MME is used as an example in this embodiment. That is, the information may be used as a notification message at a NAS stratum and carried in RRC signaling, or a field may be added to the RRC message to notify cell reselection.

602. The source base station sends a notification message to the core network device, where the notification message is used to indicate that the terminal is about to reselect a cell.

After the source base station receives the indication signaling sent by the terminal, the source base station needs to send, to the core network device, the notification message that is used to notify the core network device that the terminal is about to reselect a cell.

In this embodiment, the notification message may be UL NAS transport signaling or another S1-AP message. Specifically, a message at the NAS stratum may be carried in the S1-AP message to notify a core network, or a field may be directly added to the S1-AP message or signaling to indicate the core network. Specific signaling is not limited herein.

603. The core network device stops sending downlink data to the source base station and starts a second timer.

After the core network device learns that the terminal is about to reselect a cell, the core network device starts the second timer, and the core network device stops sending the downlink data to the source base station.

In this embodiment, running duration of the second timer is preconfigured, and specific duration is not limited herein. In an actual application, the MME stops sending five data packets: a data packet 1, a data packet 2, a data packet 3, a data packet 4, and a data packet 5 to the source base station.

604. The target base station sends a first indication message to the core network device, where the first indication message is used to indicate that the terminal completes cell reselection.

After the terminal is successfully connected to the target base station, the target base station sends the first indication message to the core network device, to notify the core network device that the terminal has completed cell reselection.

In this embodiment, the first indication message may be a message such as an initial UE message or a path switch message that is sent by the target base station to the core network device. A specific message form is not limited herein.

In this embodiment, if the target base station does not send the first indication message to the core network device after the second timer expires, it indicates that the terminal fails to connect to the target base station. In this case, the core network device resumes sending the downlink data to the source base station. For example, after the second timer expires, if the MME does not receive a message that is sent by the target base station and that indicates that the terminal has completed cell reselection, the MME starts to send the five data packets: the data packet 1, the data packet 2, the data packet 3, the data packet 4, and the data packet 5 to the source base station again.

605. The core network device sends the downlink data to the target base station.

After receiving the first indication message, the core network device sends, to the target base station, the downlink data that is not sent.

606. The target base station sends the downlink data to the terminal.

The target base station forwards the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received.

In this embodiment, after the core network device receives the message that the terminal is about to reselect a cell, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 7:
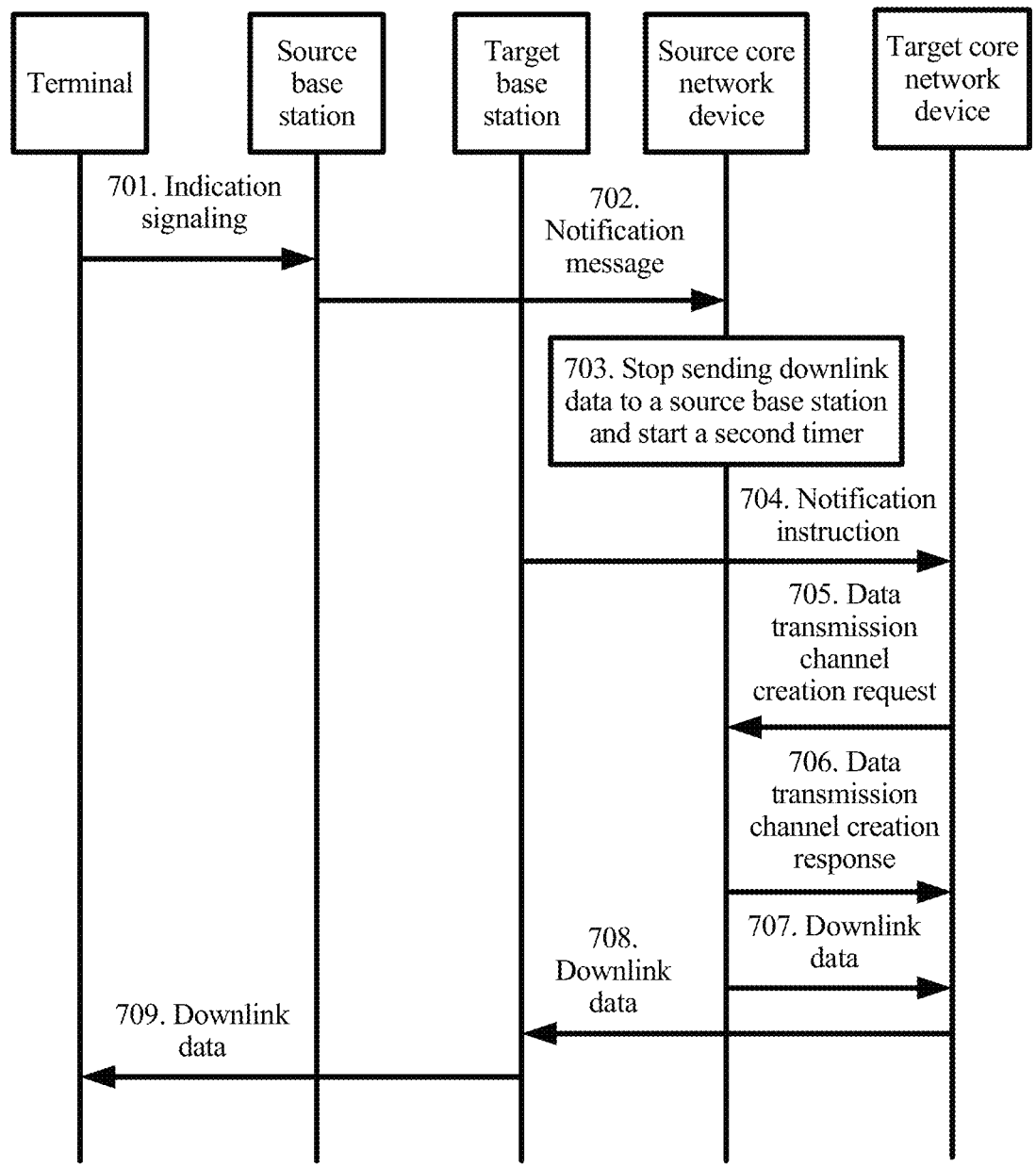
FIG. 7 is a schematic diagram of another embodiment of a data processing method according to an embodiment of this application.

Specifically, referring to FIG. 7, in this embodiment, the terminal reselects a cell, and a core network device transfers data. A source base station and a target base station are connected to different core network devices.

Step 701 and step 601 are the same, and details are not described herein again.

702. The source base station sends a notification message to a source core network device, where the notification message is used to indicate that the terminal is about to reselect a cell.

After the source base station receives indication signaling sent by the terminal, the source base station needs to send, to the source core network device, the notification message that is used to notify the source core network device that the terminal is about to reselect a cell.

In this embodiment, the notification message may be UL NAS transport signaling or another S1-AP message. Specific signaling is not limited herein.

703. The source core network device stops sending downlink data to the source base station and starts a second timer.

After the source core network device learns that the terminal is about to reselect a cell, the source core network device starts the second timer, and the source core network device stops sending the downlink data to the source base station.

In this embodiment, running duration of the second timer is preconfigured, and specific duration is not limited herein. In an actual application, the source MME stops sending five data packets: a data packet 1, a data packet 2, a data packet 3, a data packet 4, and a data packet 5 to the source base station.

704. The target base station sends a notification instruction to a target core network device, where the notification instruction is used to indicate that the terminal has completed cell reselection and instruct the target core network device to request data from the source core network device.

After the terminal establishes a connection to the target base station, the target base station sends the notification instruction to the target core network device, where the notification instruction is used to indicate that the terminal has completed cell reselection and notify the target core network device that the target core network device needs to request the downlink data from the source core network device.

In this embodiment, the target base station may send an initial UE message to the target core network device. In addition, the initial UE message carries a field or an information element that is used to indicate that the target core network device needs to request the downlink data from the source core network device. In this case, the initial UE message can be used as the first instruction. For example, in this embodiment, the target base station may send an initial UE message to the target MME, and add a field 1100 to the initial UE message, where the field 1100 is used to indicate that the target MME needs to request the five data packets: the data packet 1, the data packet 2, the data packet 3, the data packet 4, and the data packet 5 from the source MME.

705. The target core network device sends a data transmission channel creation request to the source core network device.

The target core network device sends the data transmission channel creation request to the source core network device.

In this embodiment, the data transmission channel creation request may be a create data forwarding tunnel request. Specific signaling is not limited herein.

706. The source core network device sends a data transmission channel creation response to the target core network device.

After the source core network device receives the data transmission channel creation request sent by the target core network device, the source core network device feeds back a data transmission channel creation response to the target core network device, so as to indicate that the source core network device agrees to establish the data transmission channel.

In this embodiment, the data transmission channel creation response may be a create data forwarding tunnel response. Specific signaling is not limited herein.

707. The source core network device sends the downlink data to the target core network device.

After establishing the data transmission channel, the source core network device sends the downlink data to the target core network device. For example, the source MME sends the five data packets: the data packet 1, the data packet 2, the data packet 3, the data packet 4, and the data packet 5 to the target MME. When forwarding data to the target core network device, the source core network device may indicate the last packet, or may indicate data forwarding ending. After receiving indication information from the target base station, the target core network device sends a path switch indication to an S-GW, indicating that the target MME forwards data for the UE from now on.

708. The target core network device sends the downlink data to the target base station.

After receiving the downlink data sent by the source core network device, the target core network device forwards the downlink data to the target base station. For example, in this embodiment, the target MME sends the five data packets: the data packet 1, the data packet 2, the data packet 3, the data packet 4, and the data packet 5 to the target base station.

709. The target base station sends the downlink data to the terminal.

After the target base station receives the downlink data sent by the target core network device, the target base station sends the downlink data to the terminal.

In an actual application, after the terminal establishes a connection to the target base station, the target base station sends an initial UE message or a path switch message to the target core network device. The target core network device obtains information about the source MME and the source base station by using the indication information forwarded by the terminal through the base station. The target core network device may send information to the source core network device, so as to indicate that the terminal has established a connection to the target core network device. Therefore, the source core network device is triggered to send a data channel establishment request or a data transfer request, and the target core network device replies with a response message. Then, the source core network device forwards the data to the target core network device. How the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received.

In this embodiment, after the source core network device receives the message that the terminal is about to reselect a cell, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 8:
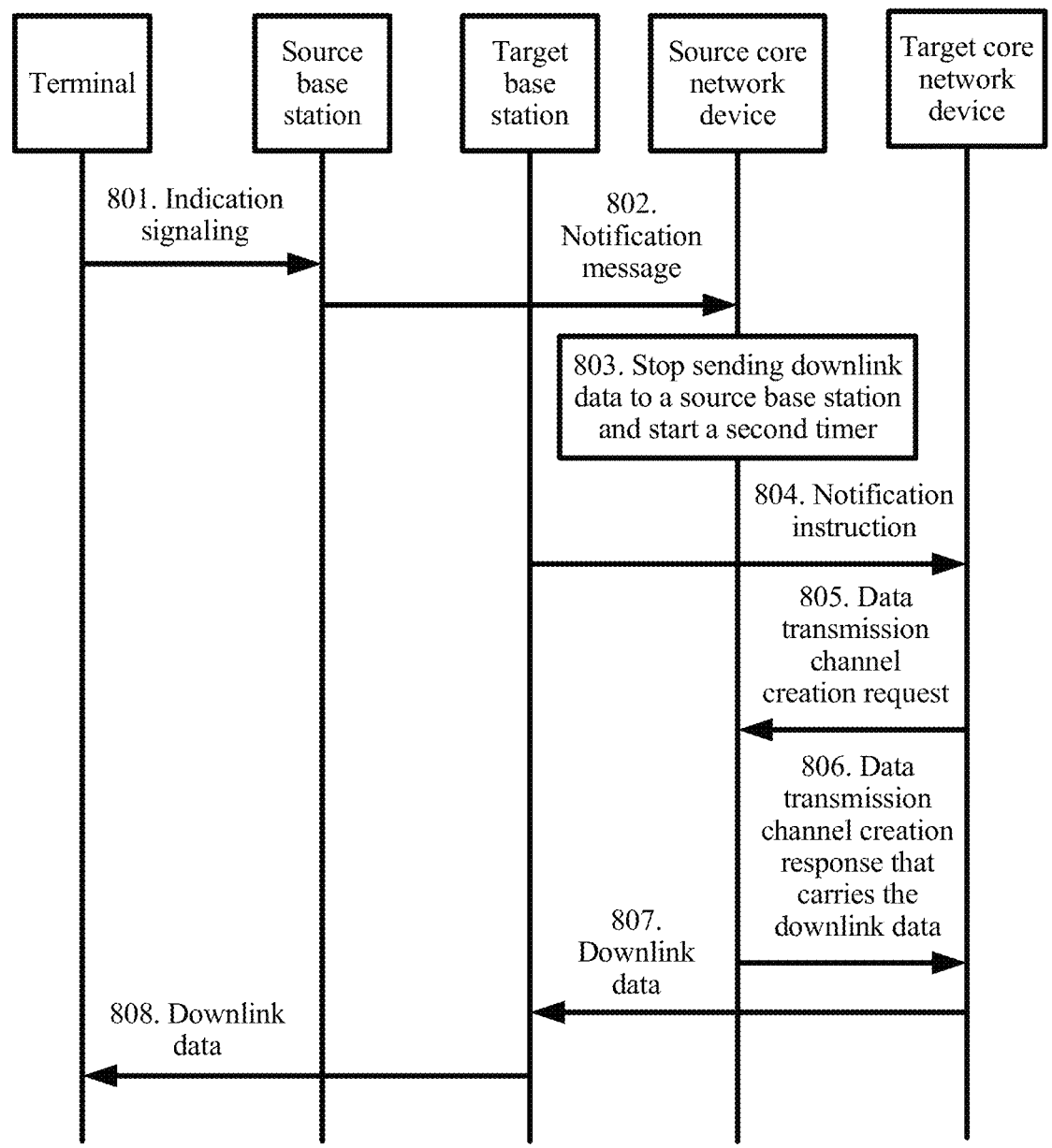
FIG. 8 is a schematic diagram of another embodiment of a data processing method according to an embodiment of this application.

Specifically, referring to FIG. 8, in this embodiment, the terminal reselects a cell, and a core network device transfers data. A source base station and a target base station are connected to different core network devices.

Step 801 to step 805 are the same as step 701 to step 705, and details are not described herein again.

806. A source core network device sends a data transmission channel creation response that carries downlink data to a target core network device.

After the source core network device receives a data transmission channel creation request sent by the target core network device, the source core network device feeds back a data transmission channel creation response to the target core network device, so as to indicate that the source core network device agrees to establish the data transmission channel; and adds the downlink data to the data transmission channel creation response.

In this embodiment, the data transmission channel creation response may be a create data forwarding tunnel response. Specific signaling is not limited herein.

Step 807 and step 808 are the same as step 708 and step 709, and details are not described herein again.

In this embodiment, after the source core network device receives the message that the terminal is about to reselect a cell, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 9:
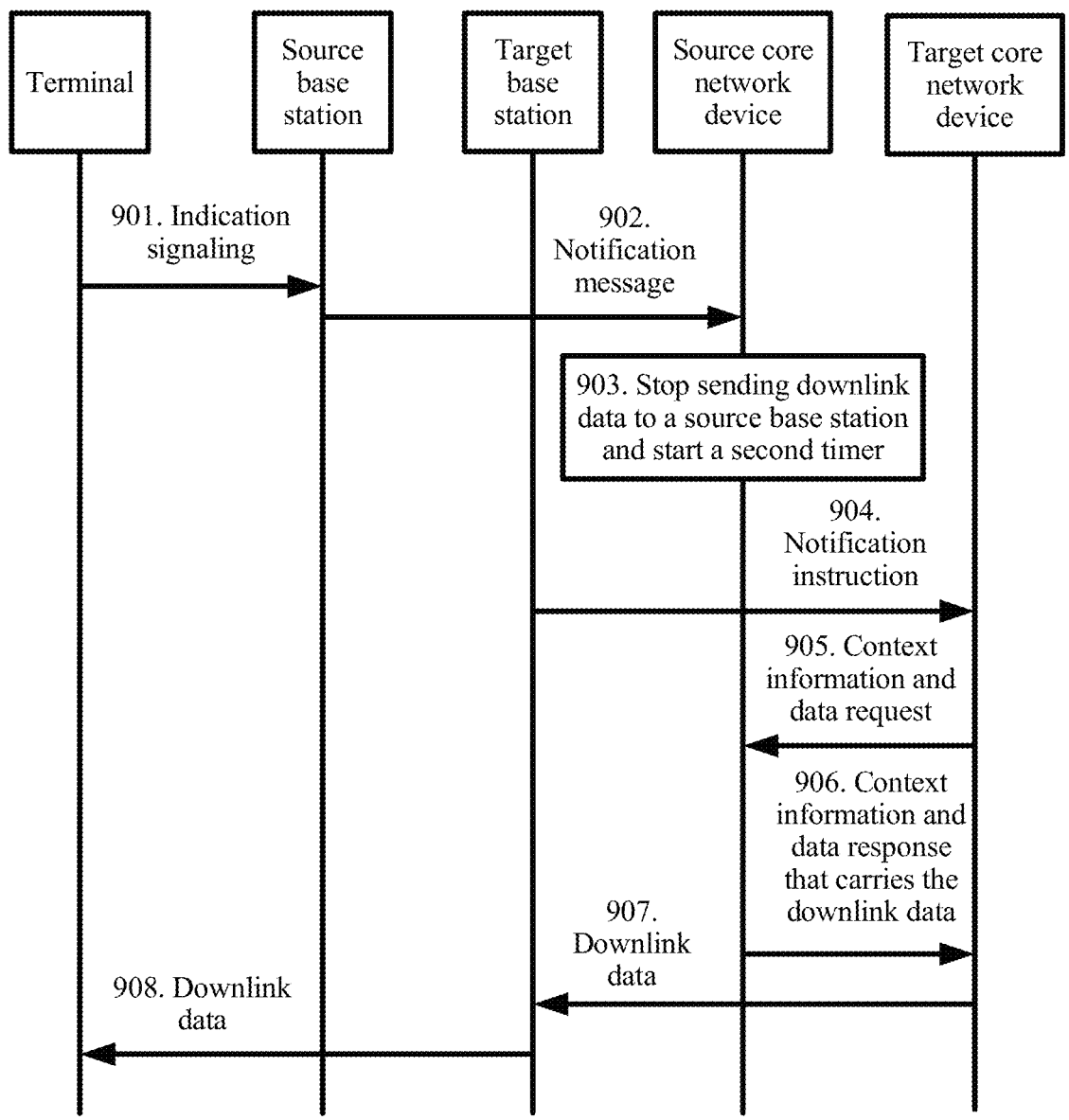
FIG. 9 is a schematic diagram of another embodiment of a data processing method according to an embodiment of this application.

Specifically, referring to FIG. 9, in this embodiment, the terminal reselects a cell, and a core network device transfers data. A source base station and a target base station are connected to different core network devices.

Step 901 to step 904 are the same as step 701 to step 704, and details are not described herein again.

905. A target core network device sends a context information and data request to a source core network device.

After the target core network device receives a first instruction that is sent by the target base station and that is used to indicate that the target core network device needs to request the downlink data from the source core network device, the target core network device may directly send a context information and data request message to the source core network device.

In this embodiment, the context information and data request message may be a context and data request. Specific signaling is not limited herein.

906. The source core network device sends a context information and data response that carries downlink data to the target core network device.

After the source core network device receives the context information and data request message sent by the target core network device, the source core network device feeds back the context information and data response to the target core network device, so as to indicate that the source core network device agrees to send the context information and the downlink data; and adds the downlink data and the context information to the context information and data response.

In this embodiment, the context information and data response may be a context and data response. Specific signaling is not limited herein.

Step 907 and step 908 are the same as step 708 and step 709, and details are not described herein again.

In this embodiment, after the source core network device receives the message that the terminal is about to reselect a cell, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 10:
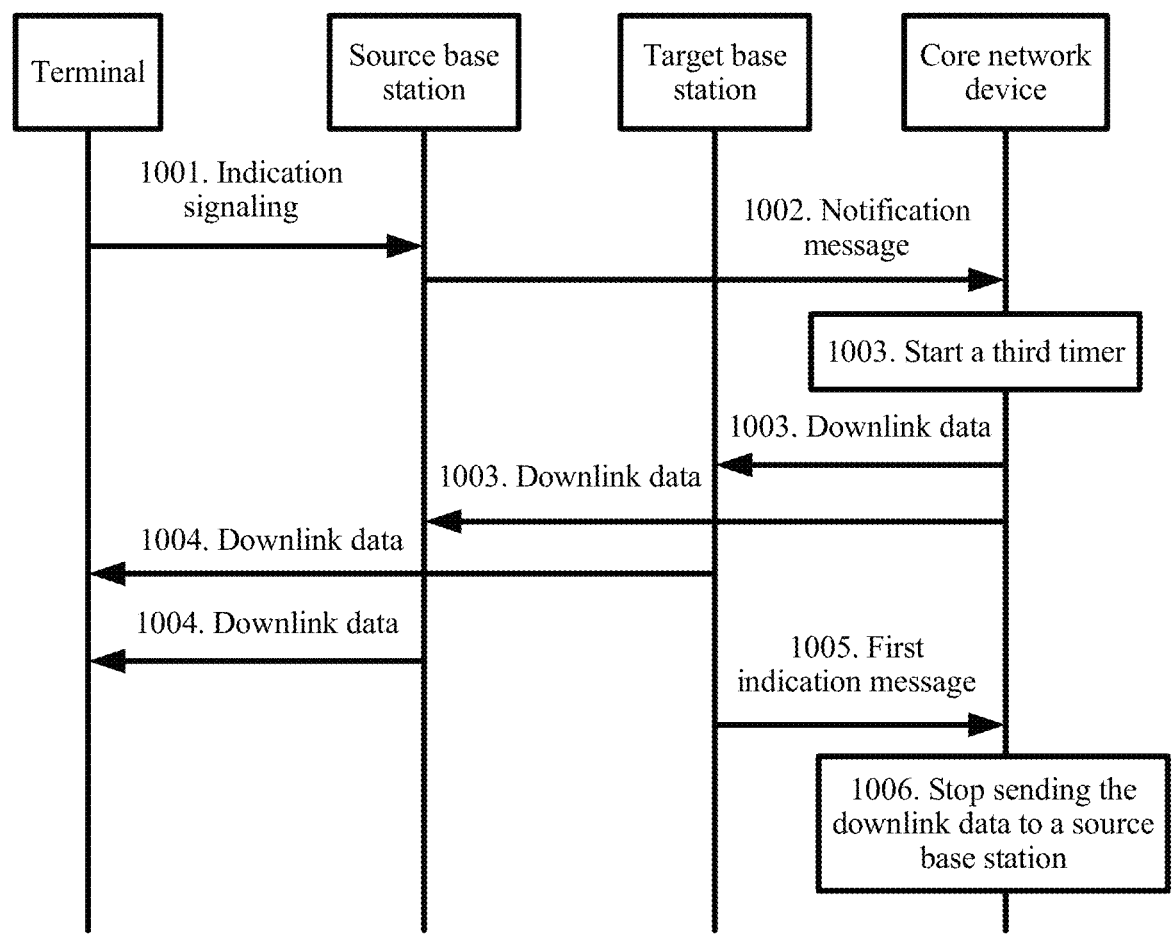
FIG. 10 is a schematic diagram of another embodiment of a data processing method according to an embodiment of this application.

Specifically, referring to FIG. 10, the terminal reselects a cell, and a core network device transfers data. A source base station and a target base station are connected to a same core network device.

Step 1001 and step 1002 are the same as step 601 and step 602, and details are not described herein again.

1003. The core network device sends downlink data to the source base station, sends the downlink data to the target base station, and starts a third timer.

After the core network device receives a first indication message used to indicate that the terminal is about to reselect a cell, the core network device may start the third timer. In addition, the core network device may send the downlink data to the target base station through an S1 interface, and the core network device still sends the downlink data to the source base station through the S1 interface.

1004. The source base station sends the downlink data to the terminal, and the target base station sends the downlink data to the terminal.

After the target base station receives the downlink data sent by the core network device, the target base station may send the downlink data to the terminal after establishing a connection to the terminal. The source base station may send the downlink data to the terminal while maintaining a connection to the terminal.

In an actual application, if the core network device transmits data in the foregoing manner, and the terminal has received a NAS PDU but the source base station has not received acknowledgment information fed back by the terminal, in this case, if the target base station sends the NAS PDU again, the terminal receives two NAS PDUs. Because the NAS PDU has no sequence number, the terminal may resolve the NAS PDU at a NAS stratum by using a NAS count. That is, after same NAS counts are discovered, a data packet corresponding to one NAS count is deleted.

1005. The target base station sends a first indication message to the core network device, where the first indication message indicates that the terminal completes cell reselection.

After the terminal is successfully connected to the target base station, the target base station sends the first indication message to the core network device, to notify the core network device that the terminal has completed cell reselection.

In this embodiment, the first indication message may be a message such as an initial UE message or a path switch message that is sent by the target base station to the core network device. A specific message form is not limited herein.

In this embodiment, if the target base station does not send the first indication message to the core network device after the third timer expires, it indicates that the terminal fails to connect to the target base station. The core network device may stop sending the downlink data to the target base station, and maintain an action of sending the downlink data to the source base station.

1006. The core network device stops sending the downlink data to the source base station.

After the core network device learns that the terminal has completed cell reselection, the core network device stops sending the downlink data to the source base station.

In an actual application, if the source base station further has uplink data sent by the terminal, the source base station continues to send sequentially and continuously received data to the core network device, and discard other out-of-order and unacknowledged data packets. In addition, after the terminal establishes a connection to the target base station, the terminal sends data to the target base station starting from the first not-received data. If a duplicate data packet occurs, the data packet is sent to the NAS stratum for processing.

In this embodiment, after the core network device receives the message that the terminal is about to reselect a cell, the core network device sends the downlink data to both the source base station and the target base station. In this way, it can be ensured that no downlink data is lost in a reselection process, and data continuity is further ensured.

Figure 11:
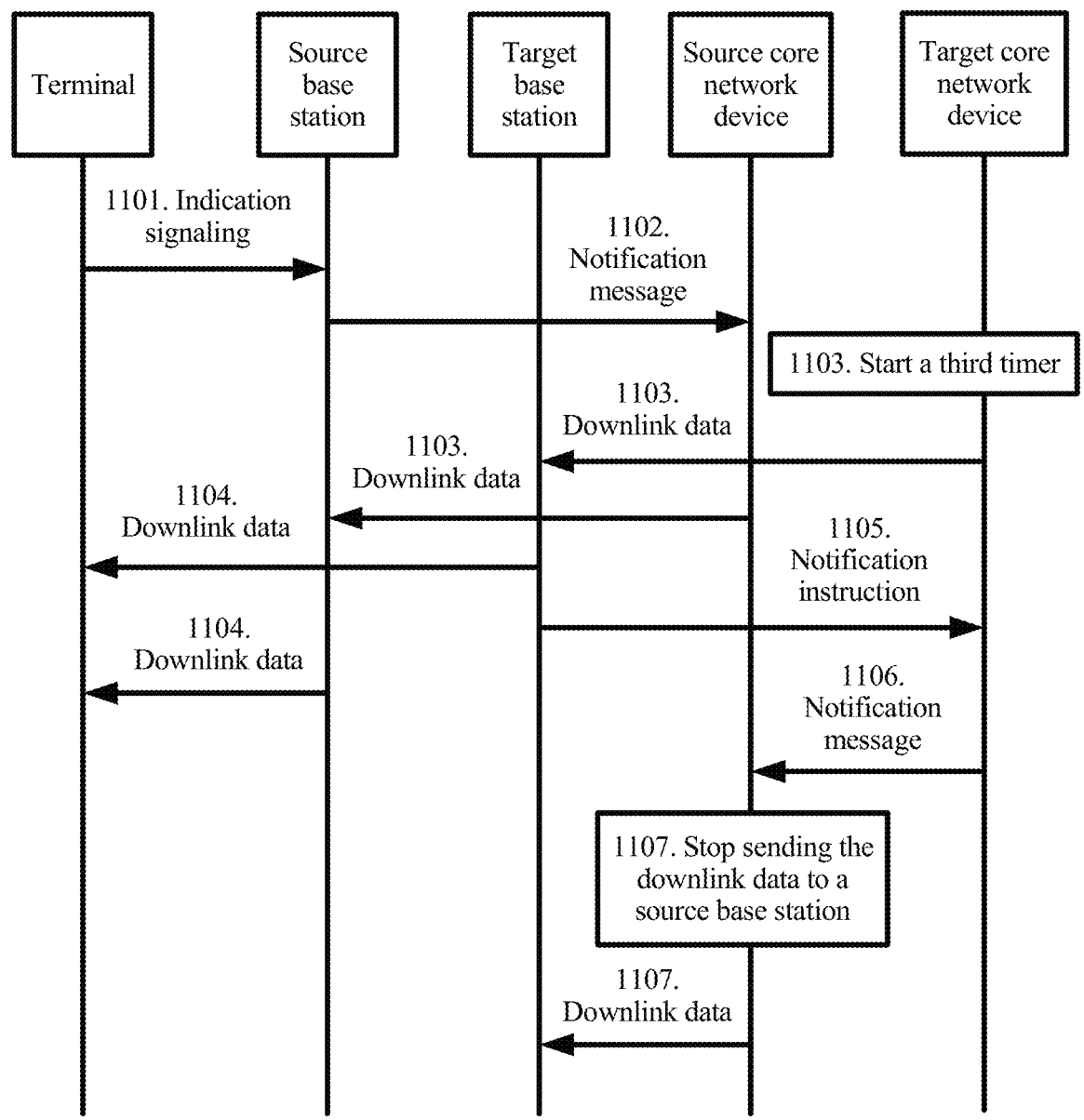
FIG. 11 is a schematic diagram of another embodiment of a data processing method according to an embodiment of this application.

Specifically, referring to FIG. 11, the terminal reselects a cell, and a core network device transfers data. A source base station and a target base station are connected to different core network devices.

Step 1101 and step 1102 are the same as step 701 and step 702, and details are not described herein again.

1103. A source core network device sends downlink data to the source base station, and a target core network device sends the downlink data to the target base station and starts a third timer.

The terminal sends indication information to the source core network device through the source base station. The indication information includes information about the target core network device and the target base station, including a specific ID, a cell identity, and the like. The source core network device finds the target core network device based on the information, and sends a data channel establishment request and indicates a cause. After receiving the message, the target core network device sends the message to the target base station, indicating a cell reselection or change request. If the target base station decides to agree with the cell reselection or change, the target base station adds corresponding configuration information to a response message, and sends the response message to the target core network device. After receiving the message from the target base station, the target core network device returns a data channel establishment request acknowledgment, and forwards the information sent by the target base station to the source core network device, and sends the information to the terminal. After receiving an acknowledgment message from the target core network device, the source core network device forwards the downlink data to the target core network device. Optionally, the source core network device may directly send a data transmission request, and the target core network sends response information. The response information may directly carry related configuration information of the target base station for the terminal. Herein, the GTP protocol is used. After receiving the response information, the source core network device directly transmits data by using signaling.

Optionally, after receiving the data, the target core network device starts the third timer, and receives, within the third timer, information sent by the terminal through the target base station, and the target core network device instructs the source core network device to stop sending the data to the source base station. If the third timer expires, and the target core network device still does not receive connection establishment information from the terminal, the target core network device stops sending the data to the target base station, and the target base station deletes related data.

1104. The source base station sends the downlink data to the terminal, and the target base station sends the downlink data to the terminal.

After the target base station receives the downlink data sent by the source core network device, the target base station may send the downlink data to the terminal after establishing a connection to the terminal. The source base station may send the downlink data to the terminal while maintaining a connection to the terminal.

In an actual application, if the source core network device transmits data in the foregoing manner, and the terminal has received a NAS PDU but the source base station has not received or incorrectly parses acknowledgment information fed back by the terminal, in this case, if the target base station sends the NAS PDU again, the terminal receives two NAS PDUs. Because the NAS PDU has no sequence number, the terminal may resolve the NAS PDU at a NAS stratum by using a NAS count. That is, after same NAS counts are discovered, a data packet corresponding to one NAS count is deleted. In a case in which duplicate packets occur on a core network side, a solution is the same.

1105. The target base station sends a notification instruction to the target core network device, and after obtaining the signaling, the target core network device learns that the terminal has completed cell reselection.

After the terminal is successfully connected to the target base station, the target base station sends a first indication message to the target core network device, to notify the target core network device that the terminal has completed cell reselection.

In this embodiment, the notification instruction may be a message such as an initial UE message or a path switch message that is sent by the target base station to the target core network device. A specific message form is not limited herein.

1106. The target core network device sends a notification message to the source core network device, where the notification message is used to indicate that the terminal has completed cell reselection.

After the target core network device learns that the terminal has completed cell reselection, the target core network device sends, to the source core network device, the notification message indicating that the terminal has completed cell reselection.

In this embodiment, if the target base station does not send the notification instruction to the target core network device after the third timer expires, it indicates that the terminal fails to connect to the target base station. In addition, the target core network device does not send the notification message to the source core network device either. In this way, the source core network device may stop sending the downlink data to the target base station, and maintain an action of sending the downlink data by the source core network device to the source base station.

1107. The source core network device stops sending the downlink data to the source base station, and sends the downlink data to the target base station.

After the source core network device learns that the terminal has completed cell reselection, the source core network device stops sending the downlink data to the source base station, and stops sending the downlink data to the target base station.

In an actual application, if the source base station further has uplink data sent by the terminal, the source base station continues to send sequentially and continuously received data to the core network device, and discard other out-of-order and unacknowledged data packets. In addition, after the terminal establishes a connection to the target base station, the terminal sends data to the target base station starting from the first not-received data.

In this embodiment, after the source core network device receives the message that the terminal is about to reselect a cell, the source core network device sends the downlink data to both the source base station and the target base station. In this way, it can be ensured that no downlink data is lost in a reselection process, and data continuity is further ensured.

Figure 12:
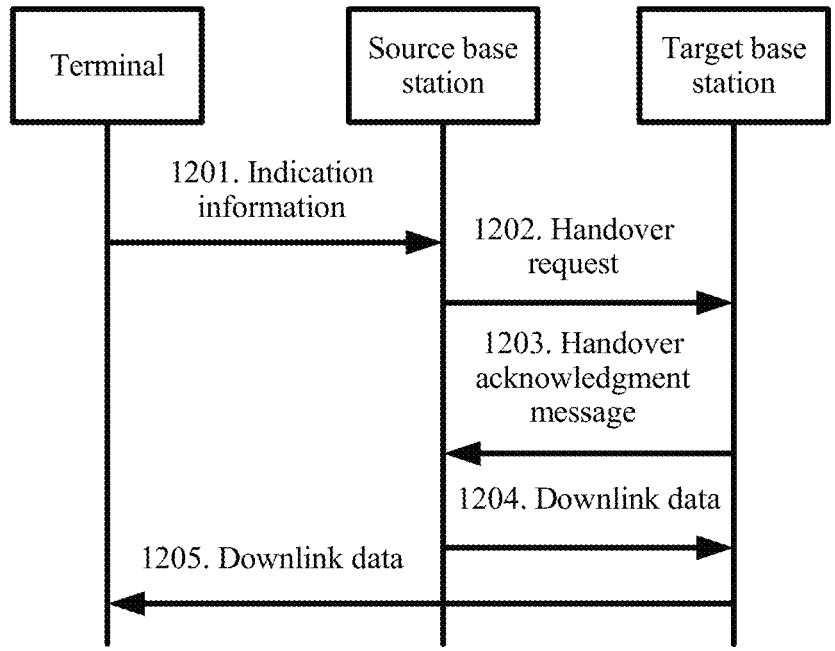
FIG. 12 is a schematic diagram of another embodiment of a data processing method according to an embodiment of this application.

Specifically, referring to FIG. 12, a terminal reselect a cell, and a base station side transfers data.

1201. A target base station sends indication information to a source base station, where the indication information is used to indicate that the terminal completes cell reselection.

After the terminal establishes a connection to the target base station, the target base station receives information about the source base station that is sent by the terminal, and the target base station may send, to the source base station based on the information about the source base station through an X2 interface, the indication information used to indicate that the terminal completes cell reselection. A specific message may be a cell reselection indication. A field is added to an RLF indication for indicating. The specific message is not limited.

1202. The source base station sends a handover request to the target base station.

After the source base station learns that the terminal completes cell reselection, the source base station sends a handover request or another X2 message to the target base station.

1203. The target base station sends a handover acknowledgment message to the source base station.

After the target base station receives the handover request from the source base station, the target base station may send a handover acknowledgment message or another X2 message to the source base station. In this way, between the target base station and the source base station, handover signaling is used as connection signaling between the target base station and the source base station.

1204. The source base station sends downlink data to the target base station.

The source base station sends the downlink data to the target base station through an X2 interface between the base stations.

In addition, in an actual application, when data is transferred between the target base station and the source base station, the target base station and the source base station may add an information element to the handover request for data forwarding. A name of the information element may be data forwarding for NAS PDU. Alternatively, the target base station and the source base station use one piece of X2-AP signaling to which downlink data forwarding is added. A name of the information element may be DL data forwarding. Alternatively, when sending a handover request command (handover request) to the target base station, the source base station adds, to the handover request, an information element used to indicate that there is data to be sent to the target core network device, and after receiving the handover acknowledgment message sent by the target base station, the source base station further sends data transfer signaling to the target base station. In this case, the signaling includes an information element that may be data forwarding for NAS PDU. Alternatively, the target base station establishes an X2 bearer corresponding to an SRB1, establishes a new E-RAB corresponding to an EPS bearer, and a tunnel used to carry data of the E-RAB. After establishing the tunnel, the target base station sends a corresponding tunnel address to the source base station, so that the source base station forwards the data to the target base station through the tunnel. There may be a plurality of manners in which the source base station sends the downlink data to the target base station. This is not limited herein. In addition, after completing data forwarding, the source base station indicates the last packet or indicates data sending ending to the target base station. In this way, the target base station may first send data sent by the source base station to the terminal or a core network, and then send new data obtained from the core network or the terminal, so as to avoid an out-of-order case.

1205. The target base station sends the downlink data to the terminal.

The target base station sends the downlink data obtained from the source base station to the terminal.

In an actual application, to ensure that the data obtained by the target base station from the source base station can be sent in sequence, after obtaining the data from the source base station, the target base station exchanges signaling with the target core network device to receive the downlink data. Alternatively, the target base station first sends the downlink data obtained from the source base station, and then receives the downlink data sent by the target core network device. A specific manner is not limited herein.

In this embodiment, data is transmitted between the source base station and the target base station, so as to ensure that no downlink data is lost in a reselection process, and further ensure data continuity.

Figure 13:
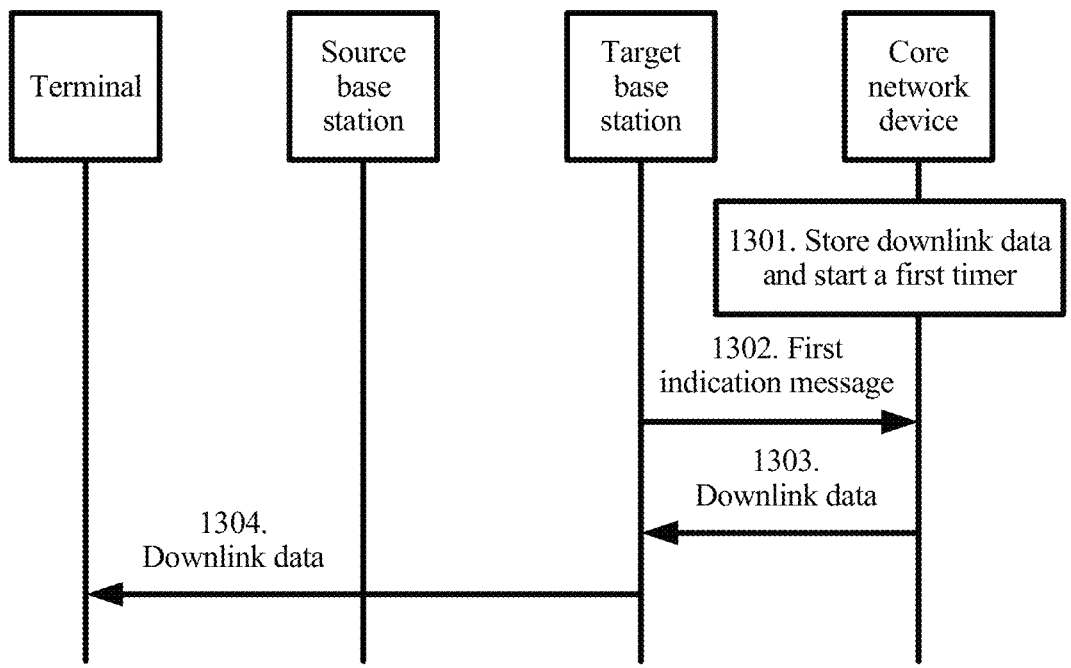
FIG. 13 is a schematic diagram of another embodiment of a data processing method according to an embodiment of this application.

Specifically, referring to FIG. 13, the terminal makes a cell change, and a core network device transfers data. A source base station and a target base station are connected to a same core network device.

1301. The core network device stores downlink data and starts a first timer.

When sending the downlink data to the terminal through the source base station, the core network device stores the sent downlink data and starts the first timer.

In this embodiment, running duration of the first timer is preconfigured, and specific duration is not limited herein. The core network device may be an MME, or may be another core network device, such as an SGW. A specific form is not limited herein, provided that the core network device can effectively ensure that data is not lost. In this embodiment, the MME is used as an example. The duration of the first timer is 10 seconds. Before cell reselection, the downlink data sent by the MME to the source base station is a data packet 1, a data packet 2, a data packet 3, a data packet 4, and a data packet 5. The MME stores the five data packets and starts the first timer.

1302. The target base station sends a first indication message to the core network device, where the first indication message is used to indicate that the terminal completes a cell change.

After the terminal is successfully connected to the target base station, the target base station sends the first indication message to the core network device, to notify the core network device that the terminal has completed a cell change.

In this embodiment, if the terminal needs to be connected to the target base station, in information such as an RRC connection establishment request or an RRC connection re-establishment request, the terminal may further add a cause of connecting the terminal to the target base station. For example, it may be indicated that a cause of currently establishing a connection is cell reselection, or it may be indicated that a cause of currently establishing a connection is a network disconnection, and data needs to be reconnected, or it may be indicated that a cause of currently establishing a connection is a cell change. A specific cause is not limited herein. Specifically, there are two data transmission solutions in NB-IoT: One is based on control plane transmission, and the other is based on user plane transmission. For the control plane solution, when establishing a connection to the target base station, the terminal may initiate an RRC connection establishment request that carries a cell reselection or another cause value. After receiving the connection establishment request, the base station sends an RRC connection establishment message to the terminal, and the terminal returns an RRC connection establishment complete message to the base station.

In the solution in which data is transmitted by using the user plane, the terminal may send an RRC connection re-establishment request to carry a cell reselection or another cause value. After receiving the connection establishment request, the base station sends an RRC connection re-establishment message to the terminal, and the terminal returns an RRC connection re-establishment complete message to the base station.

After establishing an RRC connection to the terminal, the base station sends an initial UE message or a path switch message to the core network device, where the message also carries a cause value of establishing the connection by the terminal. Then, a core network learns of a specific cause of establishing the connection.

Specifically, in the control plane transmission solution, if a radio link failure occurs, and the terminal still has a downlink acknowledgment message to be received from the core network device, the terminal may notify a NAS stratum, and the NAS stratum decides to resume the connection. The terminal sends the RRC connection establishment request to the target base station, and the RRC connection establishment request carries a cause value, indicating that currently establishing the connection is because an acknowledgment message or another cause needs to be received from the core network side. The target base station may send the message to the core network by using an initial UE message. Therefore, the core network knows the cause of establishing the connection.

Alternatively, in this scenario, the cause value carried in the RRC connection establishment request sent by the terminal is MT, and when the terminal sends the RRC connection establishment request, one information element is added to a service request message, indicating a cause of establishing the connection. Further, the cause is sent to the core network by the base station by using the initial UE message. Therefore, the core network knows the cause of establishing the connection.

Alternatively, in this scenario, the terminal initiates a tracking area update procedure.

In addition, in an actual application, when the terminal randomly accesses the target base station, the terminal may obtain configuration of a non-anchor carrier by using specific dedicated signaling or system broadcast. The dedicated signaling may be a message such as RRC connection reconfiguration or RRC connection release, and a system message may be a system message such as SIB1 or SIB2. A specific case is not limited herein. Configuration of a random access resource includes information such as duration of the random access resource, a start time of the random access resource, a carrier offset of the random access resource, a quantity of subcarriers of the random access resource, a subcarrier start location of a message 3 of the random access resource, a maximum quantity of preamble attempts, a repetition quantity of each preamble, a repetition quantity of an NPDCCH corresponding to a random access response, a start location of a downlink control channel search space corresponding to the random access response, and an offset of a downlink control channel corresponding to the random access response. The configuration of the non-anchor carrier is corresponding to control information of the random access response, and may include information such as the repetition quantity of the NPDCCH corresponding to the random access response, the start location of the downlink control channel search space corresponding to the random access response, and the offset of the downlink control channel corresponding to the random access response. A specific case is not limited herein.

In this embodiment, the first indication message may be a message such as an initial UE message or a path switch message that is sent by the target base station to the core network device. A specific message form is not limited herein.

In this embodiment, if the target base station does not send the first indication message to the core network device after the first timer expires, it indicates that the terminal fails to connect to the target base station, or the terminal does not reselect a cell in a running period of the first timer, and the core network device may delete the stored downlink data. For example, if 10 seconds later after the MME stores the five data packets, the MME does not receive a message that is sent by the target base station and that indicates that the terminal has completed cell reselection, the MME deletes the five data packets.

1303. The core network device sends the downlink data to the target base station.

The core network device sends the stored downlink data to the target base station.

In this embodiment, in a process of establishing a connection by the terminal to the target base station, the terminal may further feed back a status of receiving the downlink data. The terminal may feed back, in the following manner, the status of receiving the downlink data. For example, if the terminal has not completely received the downlink data, the terminal sends feedback information. If the terminal has completely received the downlink data, the terminal does not send the feedback information. Certainly, on the contrary, if the terminal has not completely received the downlink data, the terminal does not send the feedback information. If the terminal has completely received the downlink data, the terminal sends the feedback information. The feedback information may be carried in RRC connection establishment request signaling or RRC connection establishment complete signaling. After the target base station receives the feedback information, the target base station may further add the feedback information to initial terminal information initial UE message or a data path switch path switch message that is sent to the core network device, that is, to notify the core network device that the terminal has completely received the downlink data or the terminal has not completely received the downlink data. If the feedback information indicates that the terminal has completely received the downlink data, the core network device may delete the downlink data. If the feedback information indicates that the terminal has not completely received the downlink data, the core network device sends the downlink data to the terminal again through the target base station. A specific feedback manner and feedback information sending manner are not limited herein.

In this embodiment, the terminal may determine whether the terminal receives the five data packets. If the terminal completely receives the five data packets: the data packet 1, the data packet 2, the data packet 3, the data packet 4, and the data packet 5, the terminal may feed back, to the core network device through the target base station, that the terminal has completely received the five data packets. In this case, the core network device does not need to send the five data packets to the terminal again through the target base station. If the terminal determines that the terminal receives only three data packets: the data packet 1, the data packet 2, and the data packet 3, the terminal may feed back, to the core network device through the target base station, that the terminal does not completely receive the five data packets. In this case, the terminal may delete the received data packet 1, data packet 2, and data packet 3, and then re-receive the five data packets: the data packet 1, the data packet 2, the data packet 3, the data packet 4, and the data packet 5 that are sent by the core network device to the terminal through the target base station. If the terminal determines that the terminal receives only three data packets: the data packet 1, the data packet 2, and the data packet 3, the terminal may feed back sequence numbers or index values of the received NAS packets to the core network device. The core network device may delete the first three stored packets, and send the fourth packet and the fifth packet through the target base station. If the core network device sends only one NAS packet, and the terminal does not completely receive the NAS packet, the terminal sends a feedback to the core network device, and deletes the NAS packet that is not received completely, and the core network device sends the NAS packet again through the target base station. Specifically, the terminal receives the NAS packet and may learn, based on a sequence number of each piece of data, which packet is received, and may feed back the sequence number of the packet, or may feed back how many NAS packets are received in the current connection. A specific form is not limited.

1304. The target base station sends the downlink data to the terminal.

The target base station forwards the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received.

In this embodiment, the core network device stores the downlink data for the terminal. Then, after the terminal is handed over from the source base station to the target base station, the core network device sends the stored downlink data to the terminal. In this way, it can be ensured that no downlink data is lost in a reselection process, and data continuity is further ensured.

Figure 14:
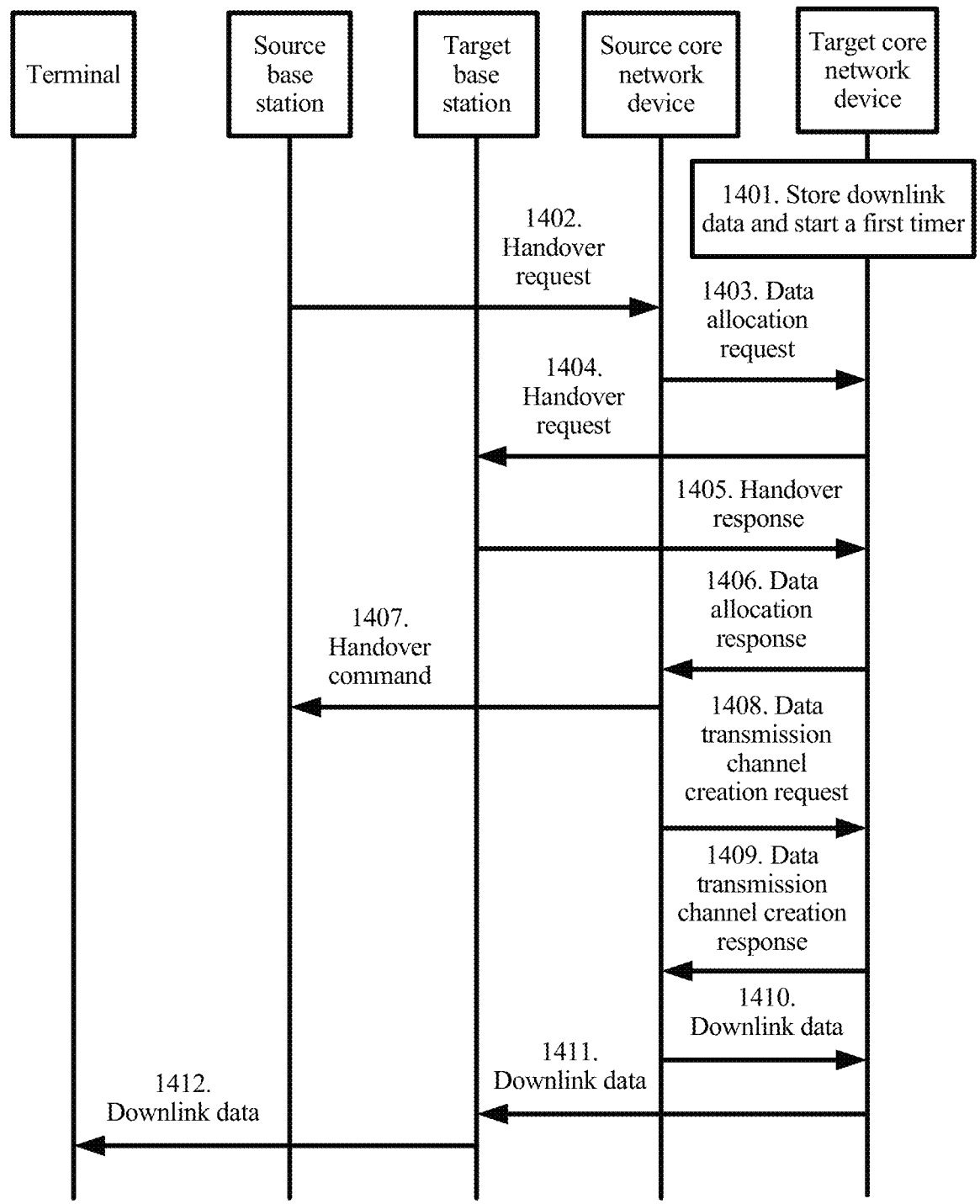
FIG. 14 is a schematic diagram of another embodiment of a data processing method according to an embodiment of this application.

Specifically, referring to FIG. 14, the terminal makes a cell change, and a core network device transfers data. A source base station and a target base station are connected to different core network devices.

Step 1401 and step 1301 are the same, and details are not described herein again.

1402. The source base station sends a handover request to a source core network device, where the handover request includes information about the target base station and information about a target core network device.

After the source base station makes a handover decision, the source base station sends a handover request to the source core network device, where the handover request includes the information about the target base station and the information about the target core network device.

In this embodiment, the handover request may be HO required signaling, or may be indicated by other signaling. Specific signaling is not limited herein.

1403. The source core network device sends a data allocation request to the target core network device.

After the source core network device receives the handover request, the source core network device sends the data allocation request to the target core network device based on the information about the target core network device.

In this embodiment, the data allocation request may be forward reallocation request signaling, or may be other signaling. This is not specifically limited herein.

1404. The target core network device sends a handover request to the target base station.

After the target core network device receives the data allocation request, the target core network device sends the handover request to the target base station.

In this embodiment, the handover request may be HO required signaling, or may be indicated by other signaling. Specific signaling is not limited herein.

S1405. The target base station sends a handover response to the target core network device.

The target base station feeds back the handover response to the target core network device.

In this embodiment, the handover response may be HO response information, or may be indicated by other signaling. Specific signaling is not limited herein.

1406. The target core network device sends a data allocation response to the source core network device.

After the target core network device receives the handover response fed back by the target base station, the target core network device feeds back the data allocation response to the source core network device.

In this embodiment, the data allocation response may be forward reallocation response signaling, or may be other signaling. This is not specifically limited herein.

1407. The source core network device sends a handover command to the source base station.

After the source core network device receives the data allocation response fed back by the target core network device, the source core network device notifies the source base station that a handover can be performed.

In this embodiment, the handover command may be HO command signaling, or may be other signaling. This is not specifically limited herein.

1408. The source core network device sends a data transmission channel creation request to the target core network device.

The source core network device sends the data transmission channel creation request to the target core network device.

In this embodiment, the data transmission channel creation request may be a create indirect data forwarding tunnel request. Specific signaling is not limited herein.

1409. The target core network device sends a data transmission channel creation response to the source core network device.

After the target core network device receives the data transmission channel creation request sent by the source core network device, the target core network device feeds back a data transmission channel creation response to the source core network device, so as to indicate that the target core network device agrees to establish the data transmission channel.

In this embodiment, the data transmission channel creation response may be a create indirect data forwarding tunnel response. Specific signaling is not limited herein.

1410. The source core network device sends downlink data to the target core network device.

After establishing the data transmission channel, the source core network device sends the downlink data to the target core network device. For example, the source MME sends five data packets: a data packet 1, a data packet 2, a data packet 3, a data packet 4, and a data packet 5 to the target MME.

1411. The target core network device sends the downlink data to the target base station.

After receiving the downlink data sent by the source core network device, the target core network device forwards the downlink data to the target base station. For example, in this embodiment, the target MME sends the five data packets:

the data packet 1, the data packet 2, the data packet 3, the data packet 4, and the data packet 5 to the target base station.

1412. The target base station sends the downlink data to the terminal.

After the target base station receives the downlink data sent by the target core network device, the target base station sends the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received.

In this embodiment, the source core network device stores the downlink data for the terminal. Then, after the terminal is handed over from the source base station to the target base station, the source core network device sends the stored downlink data to the target core network device, and then the downlink data is sent to the terminal through the target base station. In this way, it can be ensured that no downlink data is lost in a reselection process, and data continuity is further ensured.

Figure 15:
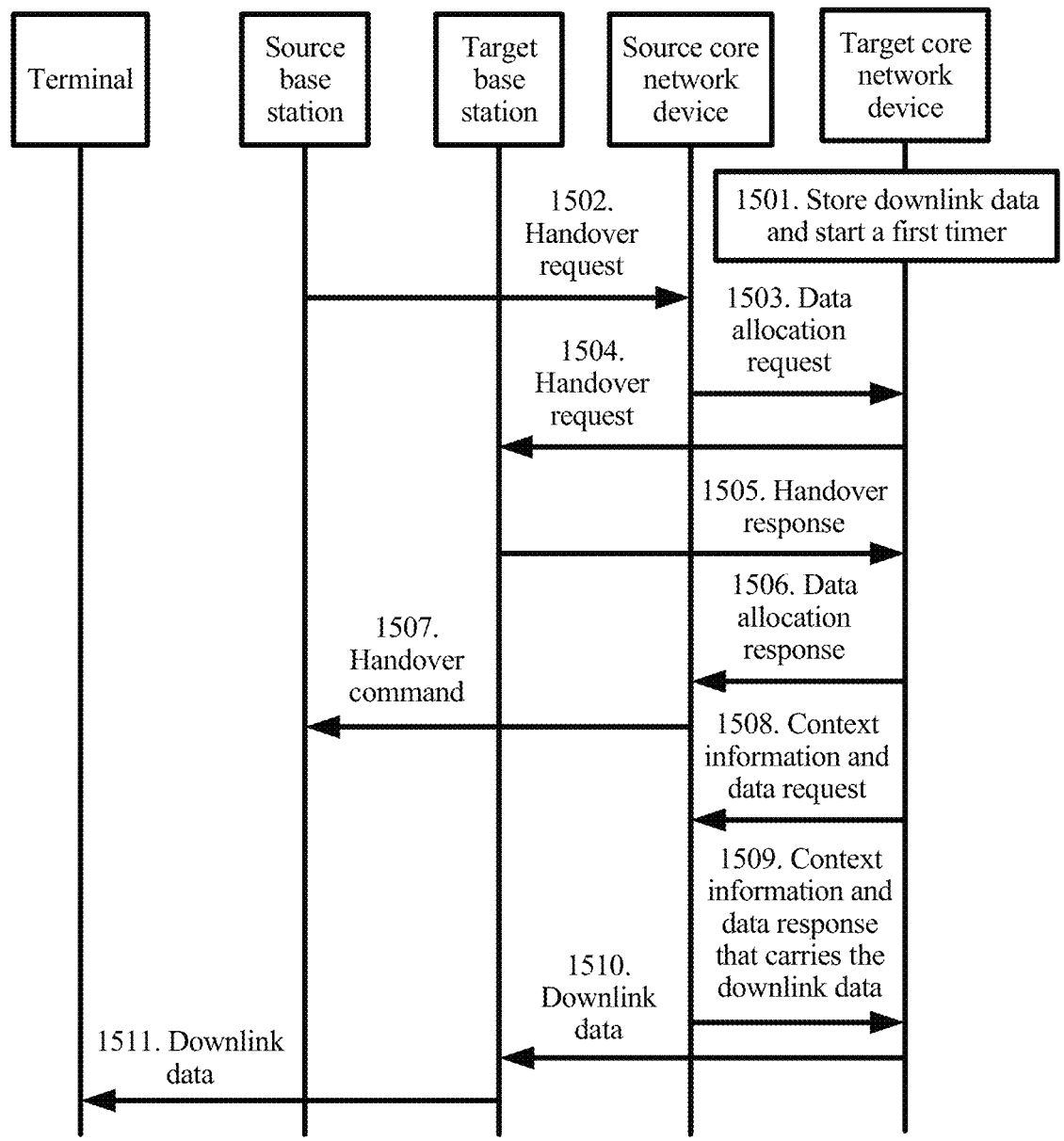
FIG. 15 is a schematic diagram of another embodiment of a data processing method according to an embodiment of this application.

Specifically, referring to FIG. 15, the terminal makes a cell change, and a core network device transfers data. A source base station and a target base station are connected to different core network devices.

Step 1501 to step 1507 are the same as step 1401 to step 1407, and details are not described herein again.

1508. A target core network device sends a context information and data request to a source core network device.

After the target core network device receives a first instruction that is sent by the target base station and that is used to indicate that the target core network device needs to request the downlink data from the source core network device, the target core network device may directly send a context information and data request message to the source core network device.

In this embodiment, the context information and data request message may be a context and data request. Specific signaling is not limited herein.

1509. The source core network device sends a context information and data response that carries downlink data to the target core network device.

After the source core network device receives the context information and data request message sent by the target core network device, the source core network device feeds back the context information and data response to the target core network device, so as to indicate that the source core network device agrees to send the context information and the downlink data; and adds the downlink data and the context information to the context information and data response.

In this embodiment, the context information and data response may be a context and data response. Specific signaling is not limited herein.

Step 1510 and step 1511 are the same as step 1411 and step 1412, and details are not described herein again.

In this embodiment, the source core network device stores the downlink data for the terminal. Then, after the terminal is handed over from the source base station to the target base station, the source core network device sends the stored downlink data to the target core network device, and then the downlink data is sent to the terminal through the target base station. In this way, it can be ensured that no downlink data is lost in a reselection process, and data continuity is further ensured.

Figure 16:
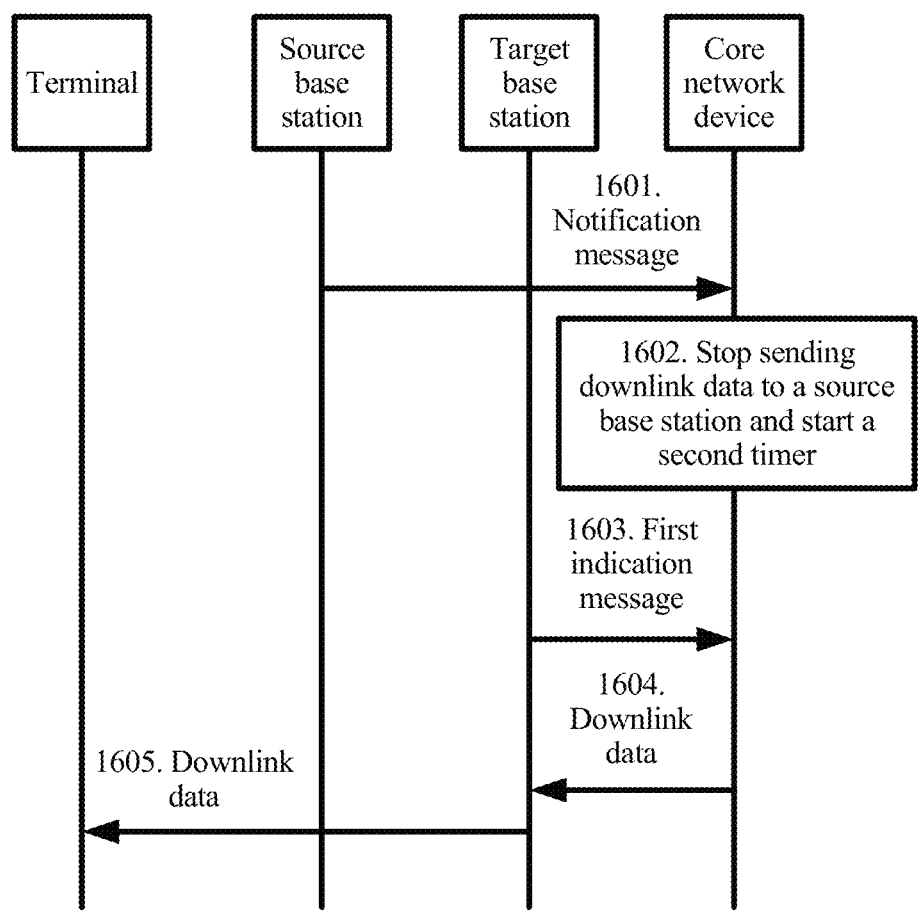
FIG. 16 is a schematic diagram of another embodiment of a data processing method according to an embodiment of this application.

Specifically, referring to FIG. 16, the terminal makes a cell change, and a core network device transfers data. A source base station and a target base station are connected to a same core network device.

1601. The source base station sends a notification message to the core network device, where the notification message is used to indicate that the terminal is about to make a cell change.

After the source base station makes a handover decision, the source base station sends the notification message to the core network device, to notify the core network device that the terminal is about to make a cell change.

In this embodiment, the source base station may send an S1-AP message to notify the core network device. A signaling name may be an HO indication, or may be other signaling. This is not specifically limited herein.

1602. The core network device stops sending downlink data to the source base station and starts a second timer.

After the core network device learns that the terminal is about to make a cell change, the core network device starts the second timer, and the core network device stops sending the downlink data to the source base station.

In this embodiment, running duration of the second timer is preconfigured, and specific duration is not limited herein. In an actual application, the MME stops sending five data packets: a data packet 1, a data packet 2, a data packet 3, a data packet 4, and a data packet 5 to the source base station.

1603. The target base station sends a first indication message to the core network device, where the first indication message is used to indicate that the terminal completes a cell change.

After the terminal is successfully connected to the target base station, the target base station sends the first indication message to the core network device, to notify the core network device that the terminal has completed a cell change.

In this embodiment, the first indication message may be a message such as an initial UE message or a path switch message that is sent by the target base station to the core network device. A specific message form is not limited herein.

In this embodiment, if the target base station does not send the first indication message to the core network device after the second timer expires, it indicates that the terminal fails to connect to the target base station. In this case, the terminal resumes sending the downlink data to the source base station. For example, after the second timer expires, if the MME does not receive a message that is sent by the target base station and that indicates that the terminal has completed cell reselection, the MME starts to send the five data packets: the data packet 1, the data packet 2, the data packet 3, the data packet 4, and the data packet 5 to the source base station again.

1604. The core network device sends the downlink data to the target base station.

After receiving the first indication information, the core network device sends, to the target base station, the downlink data that is not sent.

1605. The target base station sends the downlink data to the terminal.

The target base station forwards the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send,to the core network device, data packets that are sequentially received.

In this embodiment, after the source core network device receives the message that the terminal is about to make a cell change, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 17:
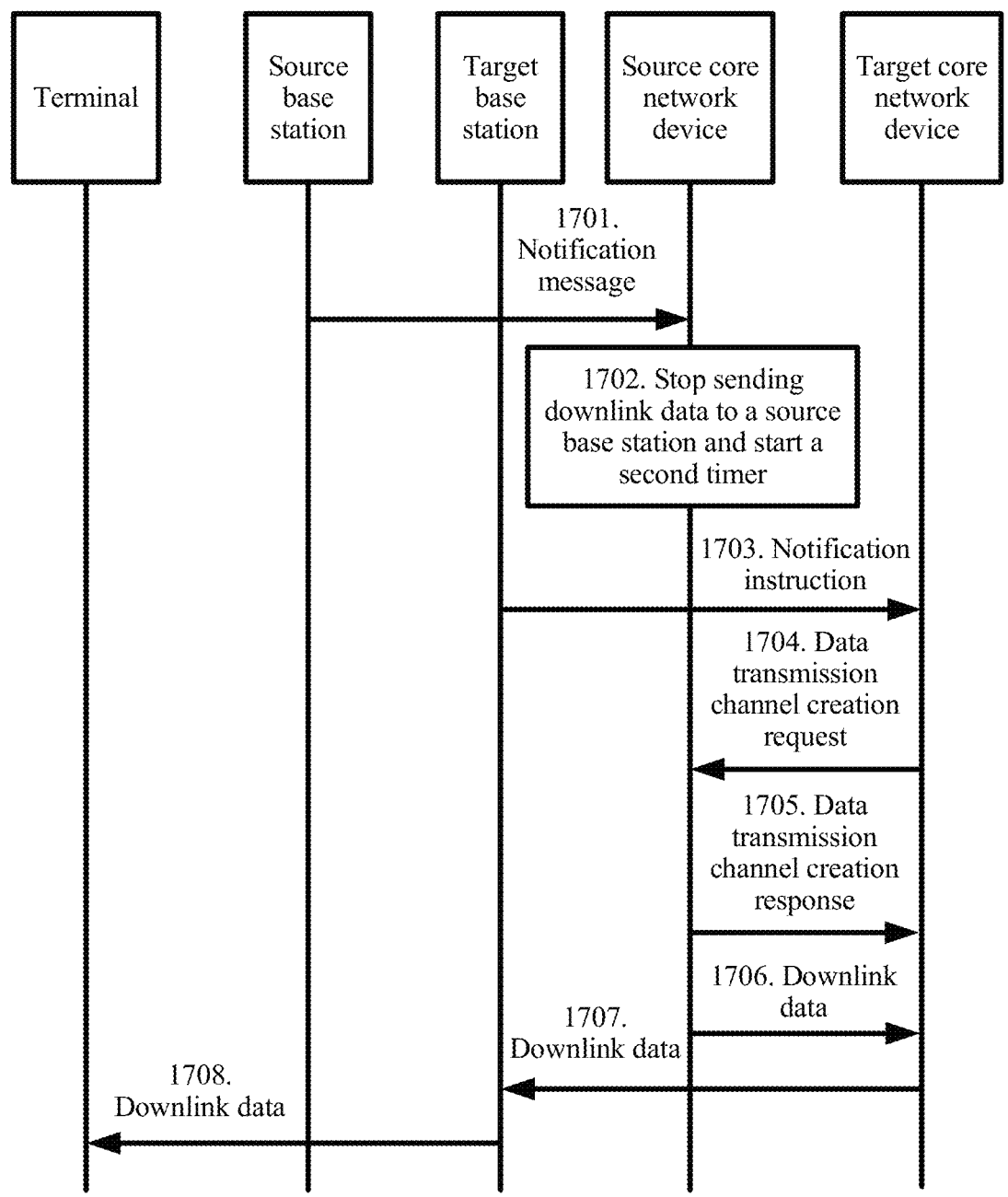
FIG. 17 is a schematic diagram of another embodiment of a data processing method according to an embodiment of this application.

Specifically, referring to FIG. 17, the terminal makes a cell change, and a core network device transfers data. A source base station and a target base station are connected to different core network devices.

1701. The source base station sends a notification message to a source core network device, where the notification message is used to indicate that the terminal is about to make a cell change.

After the source base station makes a change decision, the source base station sends the notification message to the source core network device, to notify the source core network device that the terminal is about to make a cell change.

In this embodiment, the source base station may send an S1-AP message, such as UL NAS transport, to notify the source core network device. A signaling name may be an HO indication, or may be other signaling. This is not specifically limited herein.

1702. The source core network device stops sending downlink data to the source base station and starts a second timer.

After the source core network device learns that the terminal is about to make a cell change, the source core network device starts the second timer, and the source core network device stops sending the downlink data to the source base station.

In this embodiment, running duration of the second timer is preconfigured, and specific duration is not limited herein. In an actual application, the source MME stops sending five data packets: a data packet 1, a data packet 2, a data packet 3, a data packet 4, and a data packet 5 to the source base station.

1703. The target base station sends a notification instruction to a target core network device, where the notification instruction is used to indicate that the terminal has completed a cell change and instruct the target core network device to request data from the source core network device.

After the terminal establishes a connection to the target base station, the target base station sends the notification instruction to the target core network device, where the notification instruction is used to indicate that the terminal has completed a cell change and notify the target core network device that the target core network device needs to request the downlink data from the source core network device.

In this embodiment, the target base station may send an initial UE message to the target core network device. In addition, the initial UE message carries a field or an information element that is used to indicate that the target core network device needs to request the downlink data from the source core network device. In this case, the initial UE message can be used as a first instruction. For example, in this embodiment, the target base station may send an initial UE message to the target MME, and add a field 1100 to the initial UE message, where the field 1100 is used to indicate that the target MME needs to request the five data packets: the data packet 1, the data packet 2, the data packet 3, the data packet 4, and the data packet 5 from the source MME.

1704. The target core network device sends a data transmission channel creation request to the source core network device.

The target core network device sends the data transmission channel creation request to the source core network device.

In this embodiment, the data transmission channel creation request may be a create data forwarding tunnel request. Specific signaling is not limited herein.

1705. The source core network device sends a data transmission channel creation response to the target core network device.

After the source core network device receives the data transmission channel creation request sent by the target core network device, the source core network device feeds back a data transmission channel creation response to the target core network device, so as to indicate that the source core network device agrees to establish the data transmission channel.

In this embodiment, the data transmission channel creation response may be a create data forwarding tunnel response. Specific signaling is not limited herein.

1706. The source core network device sends the downlink data to the target core network device.

After establishing the data transmission channel, the source core network device sends the downlink data to the target core network device. For example, the source MME sends the five data packets: the data packet 1, the data packet 2, the data packet 3, the data packet 4, and the data packet 5 to the target MME.

1707. The target core network device sends the downlink data to the target base station.

After receiving the downlink data sent by the source core network device, the target core network device forwards the downlink data to the target base station. For example, in this embodiment, the target MME sends the five data packets: the data packet 1, the data packet 2, the data packet 3, the data packet 4, and the data packet 5 to the target base station.

1708. The target base station sends the downlink data to the terminal.

After the target base station receives the downlink data sent by the target core network device, the target base station sends the downlink data to the terminal.

In an actual application, how the terminal sends uplink data to the core network device through the target base station may be further determined. After the terminal establishes a connection to the target base station, the terminal sends data to the target base station starting from the first data packet for which no receiving acknowledgment is received from the source base station. When the terminal starts to establish a connection to the target base station, the source base station may send, to the core network device, data packets that are sequentially received.

Optionally, the target core network device may first send a cell change complete instruction, to trigger the source core network device to send a data channel creation request message or send a data and context request message, and receive response information from the target core network device. The data may be sent in a request, or may be sent after a response is received.

In this embodiment, after the source core network device receives the message that the terminal is about to make a cell change, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 18:
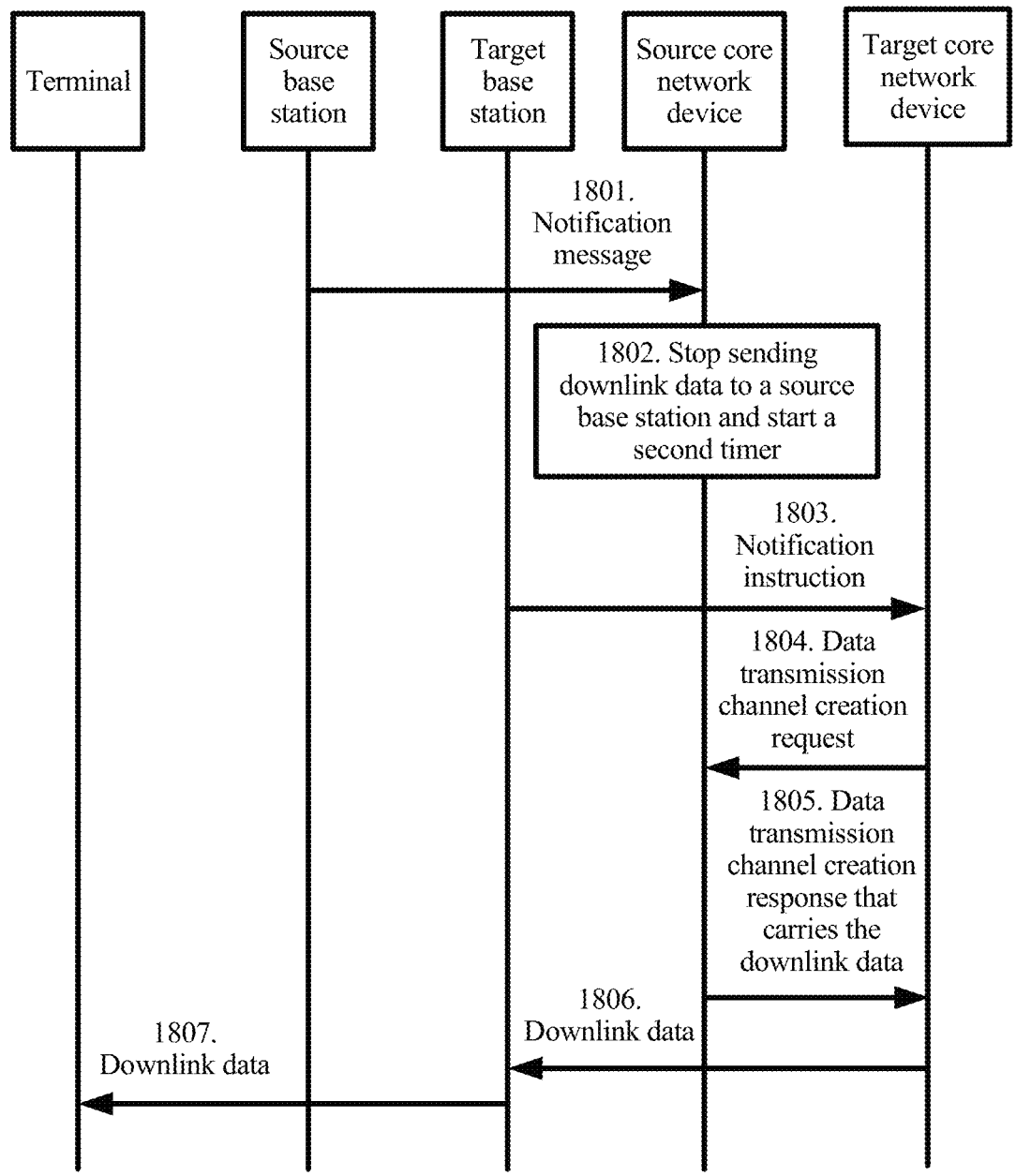
FIG. 18 is a schematic diagram of another embodiment of a data processing method according to an embodiment of this application.

Specifically, referring to FIG. 18, the terminal makes a cell change, and a core network device transfers data. A source base station and a target base station are connected to different core network devices.

Step 1801 to step 1804 are the same as step 1701 to step 1704, and details are not described herein again.

1805. A source core network device sends a data transmission channel creation response that carries downlink data to a target core network device.

After the source core network device receives a data transmission channel creation request sent by the target core network device, the source core network device feeds back a data transmission channel creation response to the target core network device, so as to indicate that the source core network device agrees to establish the data transmission channel; and adds the downlink data to the data transmission channel creation response.

In this embodiment, the data transmission channel creation response may be a create data forwarding tunnel response. Specific signaling is not limited herein.

Step 1806 and step 1807 are the same as step 1707 and step 1708, and details are not described herein again.

In this embodiment, after the source core network device receives the message that the terminal is about to make a cell change, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 19:
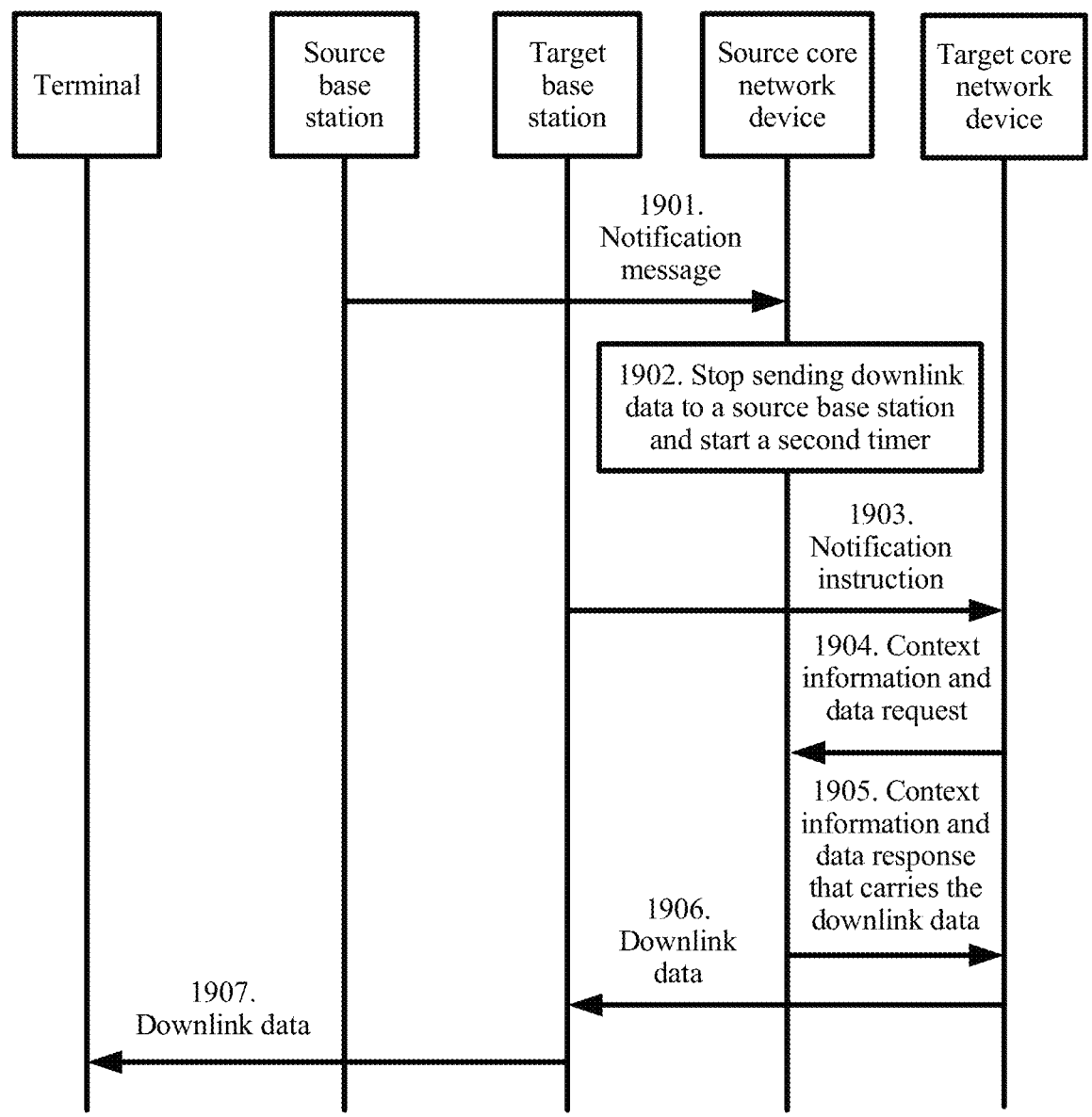
FIG. 19 is a schematic diagram of another embodiment of a data processing method according to an embodiment of this application.

Specifically, referring to FIG. 19, the terminal makes a cell change, and a core network device transfers data. A source base station and a target base station are connected to different core network devices.

Step 1901 to step 1903 are the same as step 1701 to step 1703, and details are not described herein again.

1904. A target core network device sends a context information and data request to a source core network device.

After the target core network device receives a first instruction that is sent by the target base station and that is used to indicate that the target core network device needs to request the downlink data from the source core network device, the target core network device may directly send a context information and data request message to the source core network device.

In this embodiment, the context information and data request message may be a context and data request. Specific signaling is not limited herein.

1905. The source core network device sends a context information and data response that carries downlink data to the target core network device.

After the source core network device receives the context information and data request message sent by the target core network device, the source core network device feeds back the context information and data response to the target core network device, so as to indicate that the source core network device agrees to send the context information and the downlink data; and adds the downlink data and the context information to the context information and data response.

In this embodiment, the context information and data response may be a context and data response. Specific signaling is not limited herein.

Step 1906 and step 1907 are the same as step 1707 and step 1708, and details are not described herein again.

In this embodiment, after the source core network device receives the message that the terminal is about to make a cell change, the source core network device suspends sending of the downlink data to the source base station. In this way, after the terminal is handed over from the source base station to the target base station, the source core network device sends the downlink data to the target core network device, and then the downlink data is sent to the terminal through the target base station. In this way, it can be ensured that no downlink data is lost in a reselection process, and data continuity is further ensured.

Figure 20:
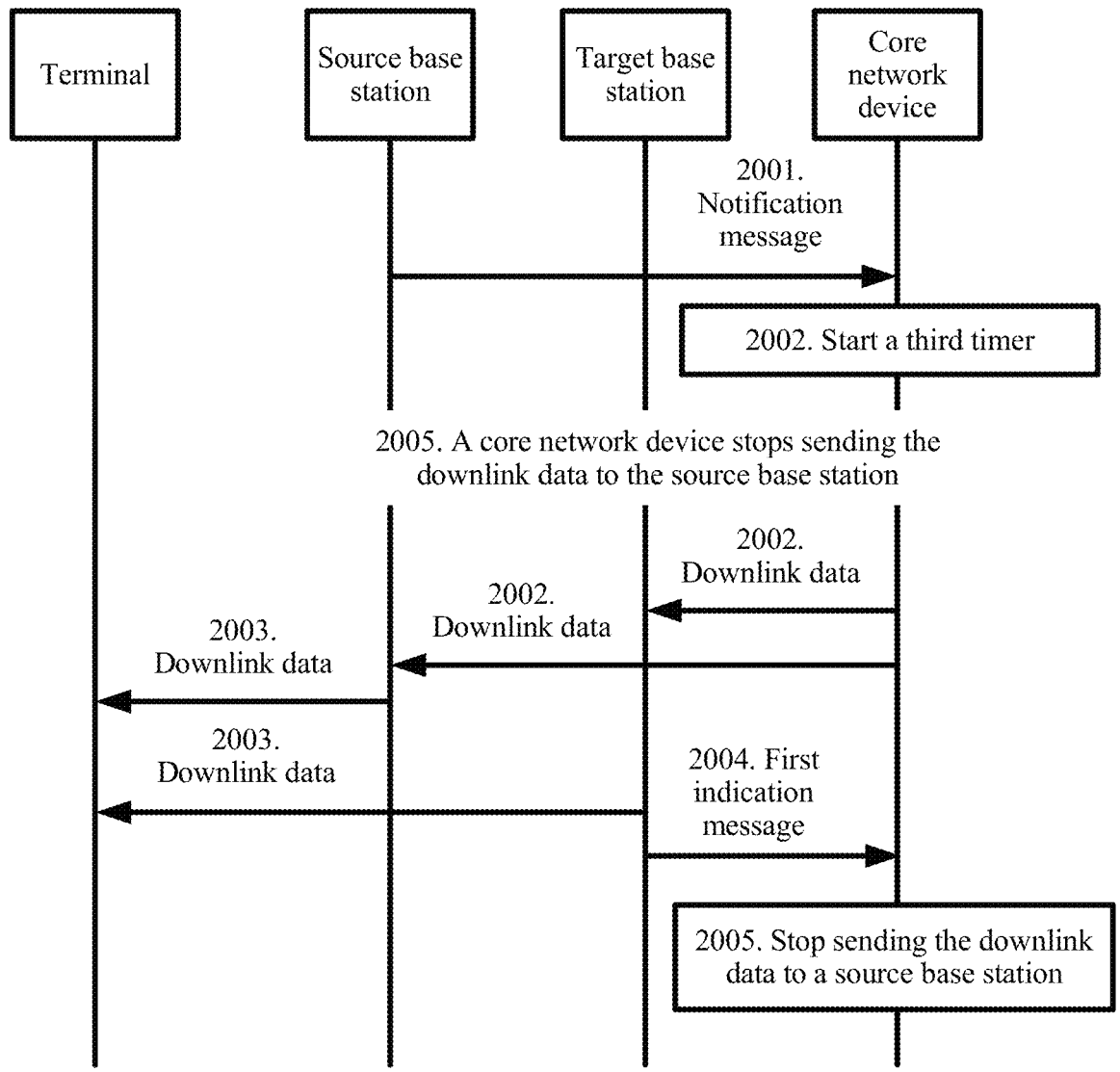
FIG. 20 is a schematic diagram of another embodiment of a data processing method according to an embodiment of this application.

Specifically, referring to FIG. 20, the terminal makes a cell change, and a core network device transfers data. A source base station and a target base station are connected to a same core network device.

Step 2001 and step 1601 are the same, and details are not described herein again.

2002. The core network device sends downlink data to the source base station, sends the downlink data to the target base station and starts a third timer.

After the core network device receives a first indication message used to indicate that the terminal is about to make a cell change, the core network device may start the third timer. In addition, the core network device may send the downlink data to the target base station through an S1 interface, and the core network device still sends the downlink data to the source base station through the S1 interface.

2003. The source base station sends the downlink data to the terminal, and the target base station sends the downlink data to the terminal.

After the target base station receives the downlink data sent by the core network device, the target base station may send the downlink data to the terminal after establishing a connection to the terminal. The source base station may send the downlink data to the terminal while maintaining a connection to the terminal.

In an actual application, if the core network device transmits data in the foregoing manner, and the terminal has received a NAS PDU but the source base station has not received acknowledgment information fed back by the terminal, in this case, if the target base station sends the NAS PDU again, the terminal receives two NAS PDUs. Because the NAS PDU has no sequence number, the terminal may resolve the NAS PDU at a NAS stratum by using a NAS count. That is, after same NAS counts are discovered, a data packet corresponding to one NAS count is deleted.

2004. The target base station sends a first indication message to the core network device, where the first indication message indicates that the terminal completes a cell change.

After the terminal is successfully connected to the target base station, the target base station sends the first indication message to the core network device, to notify the core network device that the terminal has completed a cell change.

In this embodiment, the first indication message may be a message such as an initial UE message or a path switch message that is sent by the target base station to the core network device. A specific message form is not limited herein.

In this embodiment, if the target base station does not send the first indication message to the core network device after the third timer expires, it indicates that the terminal fails to connect to the target base station. The core network device may stop sending the downlink data to the target base station, and maintain an action of sending the downlink data by the core network device to the source base station.

2005. The core network device stops sending the downlink data to the source base station.

After the core network device learns that the terminal has completed a cell change, the core network device stops sending the downlink data to the source base station.

In an actual application, if the source base station further has uplink data sent by the terminal, the source base station continues to send sequentially and continuously received data to the core network device, and discard other out-of-order and unacknowledged data packets. In addition, after the terminal establishes a connection to the target base station, the terminal sends data to the target base station starting from the first not-received data.

In this embodiment, after the core network device receives the message that the terminal is about to make a cell change, the core network device sends the downlink data to both the source base station and the target base station. In this way, it can be ensured that no downlink data is lost in a reselection process, and data continuity is further ensured.

Figure 21:
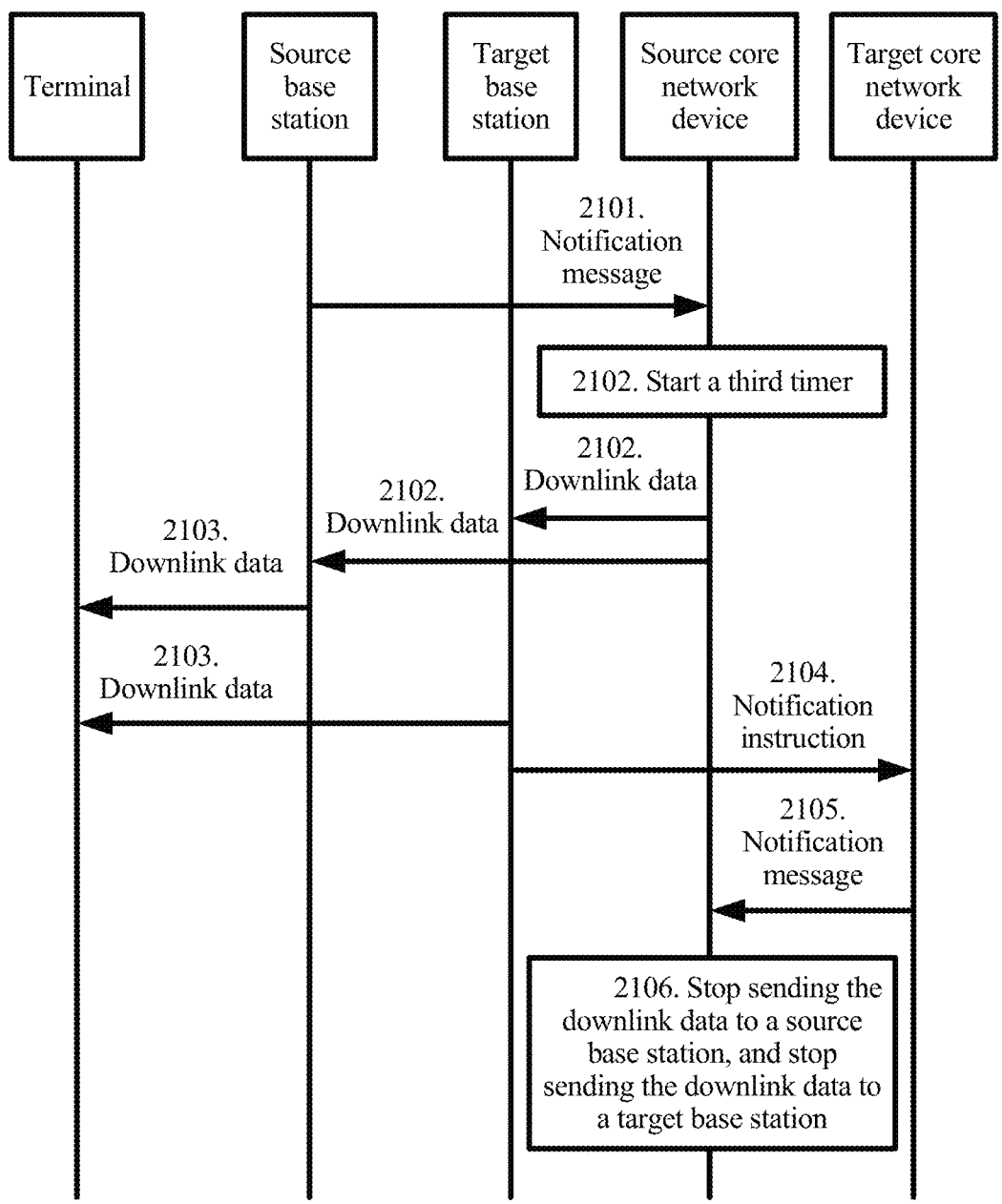
FIG. 21 is a schematic diagram of another embodiment of a data processing method according to an embodiment of this application.

Specifically, referring to FIG. 21, the terminal makes a cell change, and a core network device transfers data. A source base station and a target base station are connected to different core network devices.

Step 2101 and step 1701 are the same, and details are not described herein again.

2102. A source core network device sends downlink data to the source base station, sends the downlink data to the target base station, and starts a third timer.

After the source core network device receives a first indication message used to indicate that the terminal is about to make a cell change, the source core network device may start the third timer. In addition, the source core network device may send the downlink data to the target base station through an S1 interface, and the source core network device still sends the downlink data to the source base station through the S1 interface.

2103. The source base station sends the downlink data to the terminal, and the target base station sends the downlink data to the terminal.

After the target base station receives the downlink data sent by the source core network device, the target base station may send the downlink data to the terminal after establishing a connection to the terminal. The source base station may send the downlink data to the terminal while maintaining a connection to the terminal.

In an actual application, if the source core network device transmits data in the foregoing manner, and the terminal has received a NAS PDU but the source base station has not received acknowledgment information fed back by the terminal, in this case, if the target base station sends the NAS PDU again, the terminal receives two NAS PDUs. Because the NAS PDU has no sequence number, the terminal may resolve the NAS PDU at a NAS stratum by using a NAS count. That is, after same NAS counts are discovered, a data packet corresponding to one NAS count is deleted.

2104. The target base station sends a notification instruction to a target core network device, where the notification instruction is used to indicate that the terminal has completed a cell change.

After the terminal is successfully connected to the target base station, the target base station sends the first indication message to the target core network device, to notify the target core network device that the terminal has completed a cell change.

In this embodiment, the notification instruction may be a message such as an initial UE message or a path switch message that is sent by the target base station to the target core network device. A specific message form is not limited herein.

2105. The target core network device sends a notification message to the source core network device, where the notification message is used to indicate that the terminal has completed a cell change.

After the target core network device learns that the terminal has completed a cell change, the target core network device sends, to the source core network device, the notification message indicating that the terminal has completed a cell change.

In this embodiment, if the target base station does not send the notification instruction to the target core network device after the third timer expires, it indicates that the terminal fails to connect to the target base station. In addition, the target core network device does not send the notification message to the source core network device either. In this way, the source core network device may stop sending the downlink data to the target base station, and maintain an action of sending the downlink data by the source core network device to the source base station.

2106. The source core network device stops sending the downlink data to the source base station, and stops sending the downlink data to the target base station.

After the source core network device learns that the terminal has completed a cell change, the source core network device stops sending the downlink data to the source base station, and stops sending the downlink data to the target base station.

In an actual application, if the source base station further has uplink data sent by the terminal, the source base station continues to send sequentially and continuously received data to the core network device, and discard other out-of-order and unacknowledged data packets. In addition, after the terminal establishes a connection to the target base station, the terminal sends data to the target base station starting from the first not-received data.

In this embodiment, after the source core network device receives the message that the terminal is about to make a cell change, the source core network device sends the downlink data to both the source base station and the target base station. In this way, it can be ensured that no downlink data is lost in a reselection process, and data continuity is further ensured.

Figure 22:
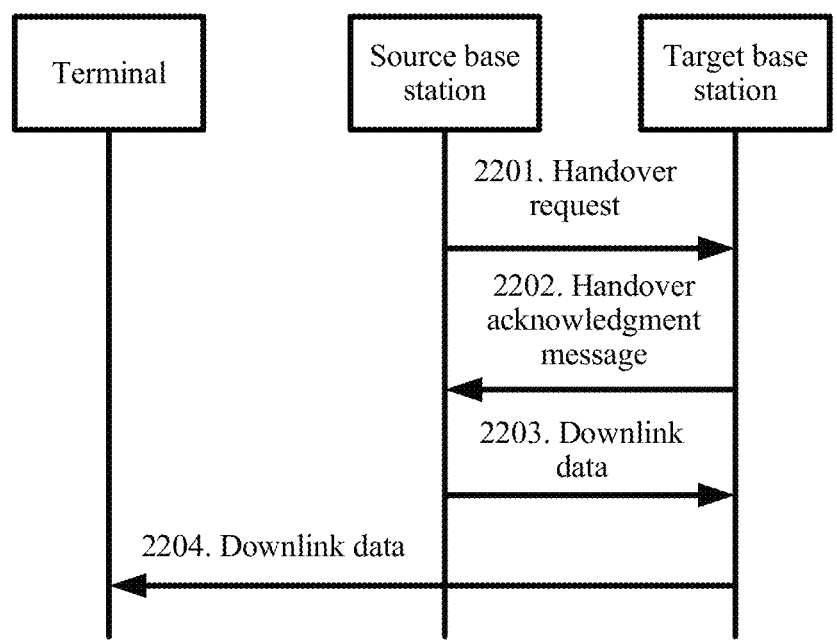
FIG. 22 is a schematic diagram of another embodiment of a data processing method according to an embodiment of this application.

Specifically, referring to FIG. 22, the terminal makes a cell change, and a base station side transfers data.

2201. A source base station sends a handover request to a target base station.

After the source base station completes a handover decision, the source base station sends the handover request to the target base station.

2202. The target base station sends a handover acknowledgment message to the source base station.

After the target base station receives the handover request from the source base station, the target base station may send a handover acknowledgment message to the source base station. In this way, between the target base station and the source base station, handover signaling is used as connection signaling between the target base station and the source base station.

2203. The source base station sends downlink data to the target base station.

The source base station sends the downlink data to the target base station through an X2 interface between the base stations.

In addition, in an actual application, when data is transferred between the target base station and the source base station, the target base station and the source base station may add an information element to the handover request for data forwarding. A name of the information element may be data forwarding for NAS PDU. Alternatively, the target base station and the source base station use one piece of X2-AP signaling to which downlink data forwarding is added. A name of the information element may be DL data forwarding. Alternatively, when sending a handover request command (handover request) to the target base station, the source base station adds, to the handover request, an information element used to indicate that there is data to be sent to a target core network device, and after receiving the handover acknowledgment message sent by the target base station, the source base station further sends data transfer signaling to the target base station. In this case, the signaling includes an information element that may be data forwarding for NAS PDU. Alternatively, the target base station establishes an X2 bearer corresponding to an SRB1, establishes a new E-RAB corresponding to an EPS bearer, and a tunnel used to carry data of the E-RAB. After establishing the tunnel, the target base station sends a corresponding tunnel address to the source base station, so that the source base station forwards the data to the target base station through the tunnel. There may be a plurality of manners in which the source base station sends the downlink data to the target base station. This is not limited herein.

2204. The target base station sends the downlink data to the terminal.

The target base station sends the downlink data obtained from the source base station to the terminal.

In an actual application, to ensure that data obtained by the target base station from the source base station can be sent in sequence, after obtaining the data from the source base station, the target base station exchanges signaling with the target core network device to receive the downlink data. Alternatively, the target base station first sends the downlink data obtained from the source base station, and then receives the downlink data sent by the target core network device. A specific manner is not limited herein.

In this embodiment, data is transmitted between the source base station and the target base station, so as to ensure that no downlink data is lost in a reselection process, and further ensure data continuity.

Based on the description of the foregoing data processing methods, while mobility of the terminal in the connected mode is maintained, in the embodiments of this application, the following solutions may further be provided to reduce power consumption of the terminal in the connected mode.

Figure 23:
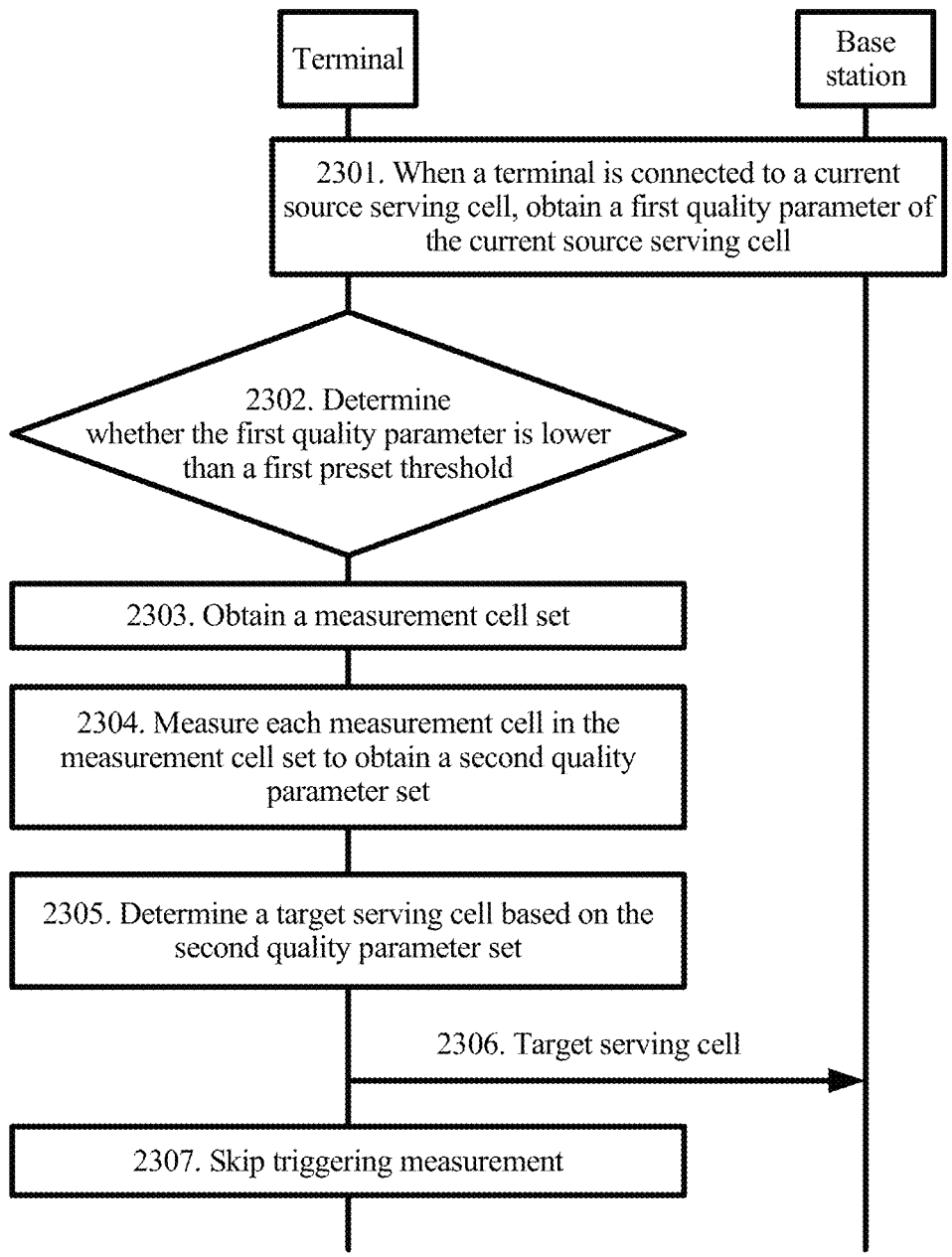
FIG. 23 is a schematic diagram of an embodiment of a cell obtaining method according to an embodiment of this application.

Specifically, referring to FIG. 23, an embodiment of this application provides a cell obtaining method, including:

2301. When a terminal is connected to a current source serving cell, the terminal obtains a first quality parameter of the current source serving cell.

When the terminal is connected to the current source serving cell, the terminal may obtain the first quality parameter of the current source serving cell in real time.

In this embodiment, the first quality parameter may be reference signal received quality or reference signal received power. A specific determining criterion is not limited herein. In an actual application, when the terminal is connected to the current source serving cell, that is, when data or signaling is exchanged between the terminal and a base station corresponding to the current source serving cell, the terminal may obtain reference signal received power or reference signal received quality of the current source serving cell, so as to determine the first quality parameter of the current source serving cell.

2302. The terminal determines whether the first quality parameter is lower than a first preset threshold, and if yes, performs step 2303 to step 2305, or if no, performs step 2306.

After obtaining the first quality parameter, the terminal determines whether the first quality parameter is lower than the first preset threshold. If the first quality parameter is lower than the first preset threshold, the terminal performs step 2303 to step 2305. If the first quality parameter is not lower than the first preset threshold, the terminal performs step 2306.

In an actual application, a threshold may be preset for the terminal in a connected mode, so as to determine whether a quality parameter of the current source serving cell meets a requirement for performing a service in the current source serving cell by the terminal, and the terminal compares the threshold with the quality parameter of the current source serving cell after obtaining the quality parameter of the current source serving cell.

2303. The terminal obtains a measurement cell set.

The terminal determines a cell that can be measured by the terminal, and generates a measurement cell set.

In this embodiment, the terminal may consider a cell whose quality parameter obtained through measurement in an idle mode is greater than or equal to a preset threshold as a measurement cell. Alternatively, a cell to which the terminal is connected within a preset time period may be used as a measurement cell. Alternatively, a cell whose signal quality stored by the terminal in a preset time period reaches a preset threshold may be used as a measurement cell. Alternatively, a cell in a cell list in a broadcast message sent by a base station connected to the terminal may be used as a measurement cell. Alternatively, a cell related to frequency information in the cell list may be used as a measurement cell. A specific manner is not limited herein, provided that the terminal can obtain a suitable measurement cell set. The terminal may obtain the broadcast message in the idle mode or the connected mode. This is not specifically limited herein. For example, the terminal measures 20 cells in the idle mode, and quality parameters of a cell A, a cell B, and a cell C are greater than a preset threshold 80. In addition, cells connected to the terminal in the last two days include a cell D, a cell E, and a cell F. Cells whose quality parameters obtained through measurement by the terminal in the last two days are greater than 80 include a cell G and a cell H. Cells in a cell list in a broadcast message sent by the base station and received by the terminal include the cell A to the cell H. Cells related to frequency information in the broadcast message sent by the base station and received by the terminal include the cell B, the cell C, the cell D, and the cell E. Therefore, the measurement cell set determined by the terminal includes at least one of the cell A to the cell H.

In addition, if a quantity of measurement cells in the measurement cell set determined by the terminal is less than a quantity of cells in the cell list or a quantity of cells related to the frequency information,

2304. The terminal measures each measurement cell in the measurement cell set to obtain a second quality parameter set.

The terminal measures each measurement cell in the measurement cell set one by one to obtain a second quality parameter of each measurement cell, and generates the second quality parameter set by using the second quality parameters.

In an actual application, the terminal may measure each measurement cell in the following manners:

In one possible implementation, the terminal measures reference signal received power of the measurement cell by using at least one of intra-frequency measurement, inter-frequency measurement, and inter-system measurement to obtain the second quality parameter.

In another possible implementation, the terminal measures reference signal received quality of the measurement cell by using at least one of intra-frequency measurement, inter-frequency measurement, and inter-system measurement to obtain the second quality parameter.

2305. The terminal determines a target serving cell based on the second quality parameter set.

The terminal determines the target serving cell from the measurement cell set based on each second quality parameter in the second quality parameter set.

In an actual application, the terminal may use a measurement cell whose second quality parameter is greater than the preset threshold as the target serving cell, or the terminal selects a measurement cell whose second quality parameter is the best as the target serving cell. For example, the measurement cell set determined by the terminal includes a cell A, a cell B, a cell D, and a cell E. Through measurement, a second quality parameter of the cell A is 87, a second quality parameter of the cell B is 85, a second quality parameter of the cell D is 75, and a second quality parameter of the cell E is 81. If the preset threshold is 85, the terminal may use the cell A and the cell B as target serving cells, or may use the cell A as the target serving cell.

After measuring the measurement cell and the serving cell, the terminal obtains the first quality parameter and the second quality parameter, or may determine the target cell according to a cell reselection rule, for example, a ranking mechanism or a priority mechanism. For example, a compensation value or an offset may be added for each cell or a cell related to a frequency based on a specifically supported service during cell reselection. In addition, the compensation value or the offset may be a default value specified in advance by each cell or a cell related to each frequency and the terminal, or the terminal may obtain the compensation value or the offset by receiving a system message broadcast by the base station, or the terminal may obtain the compensation value or the offset by receiving dedicated signaling. After obtaining the compensation value or the offset, when the terminal executes a target service and reselects a cell, the terminal may preferentially select a cell that supports the target service. For example, the cell A supports an SC-PTM service, and a compensation value or an offset value that supports the SC-PTM service is broadcast in the system broadcast. When reselecting a cell, the UE uses the ranking mechanism. When the UE calculates a cell, the compensation value or the offset is added for the UE, so that the terminal can select the cell A. Optionally, if a current cell of a terminal that supports SC-PTM does not support the SC-PTM service, even if signal quality or a signal level of the current serving cell does not trigger measurement or reselection, when the terminal learns, through system broadcasting or in another manner, that a cell or a frequency supports SC-PTM, the terminal triggers measurement for ranking and reselection, or directly measure a target cell or a cell of the frequency; and reselects a cell if a threshold requirement is met.

Optionally, if UE that supports SC-PTM learns, through system broadcasting or in another manner, that a cell or a frequency supports SC-PTM, the UE triggers measurement and uses a cell reselection rule to reselect a cell, or directly measures the target cell or a cell of the frequency; and reselects the cell if the threshold meets a reselection or camping threshold. Alternatively, if a cell that supports the service is found, the cell is reselected.

2306. The terminal sends information about the target serving cell to a base station.

After determining the target serving cell, the terminal sends an index or an ID of the target serving cell to a base station currently connected to the terminal. For example, in this embodiment, the terminal may send an index or a cell ID of the cell A to the base station, or the terminal may send indexes or cell IDs of the cell A and the cell B to the base station.

2307. The terminal skips triggering measurement.

The terminal keeps a connection to the current source serving cell and skips measuring a cell.

In this embodiment, the terminal itself determines the target serving cell, and does not report information such as measurement data to the base station, thereby reducing power consumption of the terminal.

The foregoing describes the data processing methods in the embodiments of this application. The following describes the base station and the core network device in the embodiments of this application.

Figure 24:
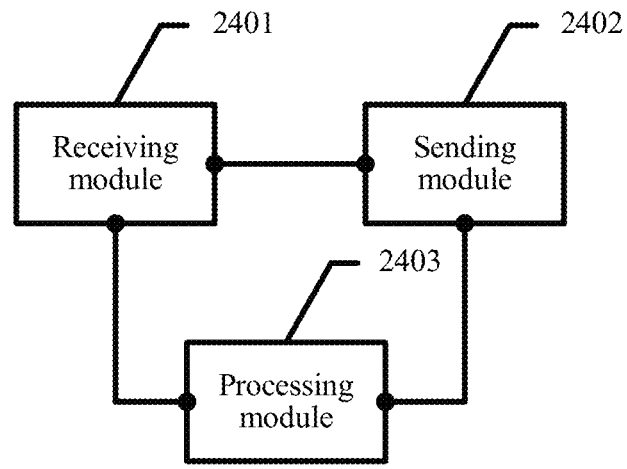
FIG. 24 is a schematic diagram of an embodiment of a terminal according to an embodiment of this application.

Specifically, referring to FIG. 24, an embodiment of a terminal according to an embodiment of this application includes:

a receiving module 2401, a sending module 2402, and a processing module 2403.

The processing module 2403 is configured to: when the terminal is connected to a current source serving cell, obtain a first quality parameter of the current source serving cell; if the first quality parameter is less than a first preset threshold, determine a measurement cell set; measure each measurement cell in the measurement cell set to obtain each corresponding second quality parameter; and determine a target serving cell based on the second quality parameter.

With reference to the foregoing embodiments, the measurement cell set includes at least one of: a cell whose quality parameter obtained by the terminal through measurement in an idle mode exceeds a preset value, a cell whose quality parameter obtained by the terminal through measurement in the idle mode ranks higher, a cell to which the terminal can be connected, a cell in a cell list in a broadcast message received by the terminal, and a cell related to frequency information in the broadcast message received by the terminal.

With reference to the foregoing embodiments, the sending module 2402 is configured to send information about the target serving cell to a source base station corresponding to the current source serving cell by using a first message, so that the source base station determines a target cell from the target serving cell.

With reference to the foregoing embodiments, the receiving module 2401 is configured to receive information about the target cell that is sent by the source base station by using a first indication message, where the information about the target cell is sent after the source base station and a target base station confirm a handover, and the target base station is a base station corresponding to the target cell.

The sending module 2402 is further configured to send a cell change acknowledgment message to the target base station by using a second indication message.

With reference to the foregoing embodiments, the first indication message is an RRC connection release message, an RRC reconfiguration message, a downlink direct transmission message, or the like.

The second indication message is an RRC connection establishment complete message, an RRC reconfiguration complete message, or an uplink direct transmission message.

With reference to the foregoing embodiments, the sending module 2402 is configured to access the target serving cell by sending a connection request message, where the connection request message is a connection establishment, connection re-establishment, connection reconfiguration complete, or cell change complete message, the connection request message carries a connection request cause, and the request cause includes cell reselection, a cell change, or waiting for downlink data.

With reference to the foregoing embodiments, the first message may be an uplink direct transmission message or an uplink radio resource control RRC message. The information about the target serving cell includes an identifier ID of the target serving cell or an index value of the target serving cell.

Further, the terminal in FIG. 24 may be further configured to perform any step of the terminal in FIG. 23, to implement any function that may be implemented by the terminal in FIG. 23.

In this embodiment, the terminal itself determines the target serving cell, and does not report information such as measurement data to the base station, thereby reducing power consumption of the terminal.

Figure 25:
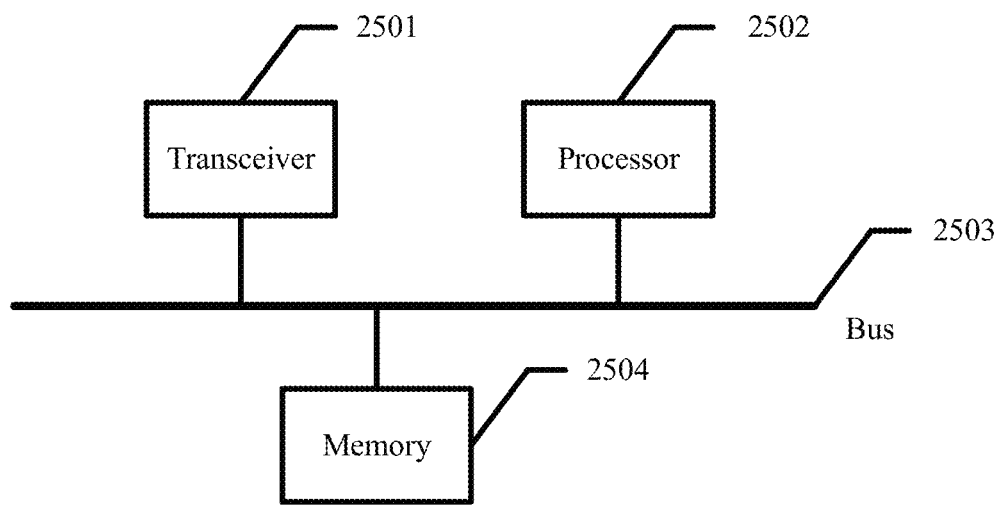
FIG. 25 is a schematic diagram of another embodiment of a terminal according to an embodiment of this application.

Specifically, referring to FIG. 25, another embodiment of a terminal according to an embodiment of this application includes:

a transceiver 2501 and a processor 2502, where the transceiver 2501 and the processor 2502 are connected to each other by using a bus 2503.

The bus 2503 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 25, but this does not mean that there is only one bus or only one type of bus.

The processor 2502 may be a central processing unit (CPU), a network processor (NP), or a combination of a CPU and an NP.

The processor 2502 may further include a hardware chip. The hardware chip may be an application-specific integrated circuit (application-specific integrated circuit, ASIC for short), a programmable logic device (PLD), or a combination thereof. The PLD may be a complex programmable logic device (CPLD), a field-programmable gate array (FPGA), a generic array logic (GAL), or any combination thereof.

Referring to FIG. 25, the terminal may further include a memory 2504, and the memory 2504 is configured to store downlink data. The memory 2504 may include a volatile memory such as a random access memory (RAM). The memory may further include a non-volatile memory (non-volatile memory) such as a flash memory (flash memory), a hard disk drive (hard disk drive, HDD for short), or a solid-state drive (solid-state drive, SSD for short). The memory 2504 may further include a combination of the foregoing types of memories.

Optionally, the memory 2504 may be further configured to store a program instruction. The processor 2502 may perform one or more steps or an optional implementation in the embodiment shown in FIG. 23 by invoking the program instruction stored in the memory 2504, to implement a function of the terminal in the foregoing method.

With reference to the foregoing embodiment, the transceiver 2501 is corresponding to the receiving module 2401 and the sending module 2402, and the transceiver 2501 performs the step of receiving and sending signaling or data by the terminal in the foregoing embodiment.

With reference to the foregoing embodiment, the processor 2502 is corresponding to the processing module 2403, and the processor performs the step of processing data by the terminal in the foregoing embodiment.

In this embodiment, the terminal itself determines the target serving cell, and does not report information such as measurement data to the base station, thereby reducing power consumption of the terminal.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data processing method, wherein the method is applicable to the Narrowband Internet of Things system comprising a terminal device, a source base station, a target base station and a core network device, wherein the core network device serves both the source base station and the target base station, and wherein the method comprises:
   starting, by the core network device, a first timer;
   storing, by the core network device, downlink data for the terminal device being sent to the source base station during a duration of the first timer;
   receiving, by the core network device, a first indication message, wherein the first indication message is used to indicate that the terminal device completes a cell change or a cell reselection from the source base station to the target base station;
   sending, by the core network device, the downlink data stored during the duration of the first timer to the target base station in response to the terminal device establishing a connection to the target base station; and
   receiving, by the core network device, feedback information used to indicate a status of receiving the downlink data by the terminal device, and based on the feedback information:
      deleting, by the core network device, the downlink data in response to the feedback information indicating that the terminal device has completely received the downlink data; or
      resending, by the core network device, the downlink data to the target base station in response to the feedback information indicating that the terminal device did not completely receive the downlink data.

2. The method according to claim 1, wherein the receiving, by the core network device, the first indication message, comprises:
   receiving, by the core network device, the first indication message that is sent by the target base station, wherein the first indication message is sent after the target base station receives a radio resource control (RRC) connection re-establishment request sent by the terminal device, wherein the RRC connection re-establishment request carries a reason for connecting to the target base station.

3. A data processing method, wherein the method is applicable to a Narrowband Internet of Things system comprising a terminal device, a source base station, a target base station and a core network device, wherein the core network device serves both the source base station and the target base station, and wherein the method comprises:
   sending, by the target base station, a first indication message to the core network device, wherein the first indication message is used to indicate that the terminal device completes a cell change or a cell reselection from the source base station to the target base station;
   receiving, by the target base station, downlink data from the core network device, wherein the downlink data is data meant for the terminal device and sent to the source base station that is stored by the core network device during a duration of a first timer, and wherein the first timer is initiated prior to sending the first indication message;
   receiving, by the target base station, feedback information used to indicate a status of receiving the downlink data by the terminal device; and
   sending, by the target base station, the feedback information to the core network device,
   wherein the core network can delete the downlink data in response to the feedback information indicating that the terminal device has completely received the downlink data, or the core network can resending the downlink data to the target base station in response to the feedback information indicating that the terminal device did not completely receive the downlink data.

4. The method according to claim 3, wherein the method further comprises:
   receiving, by the target base station, a radio resource control (RRC) connection re-establishment request sent by the terminal device, wherein the RRC connection re-establishment request carries a reason for connecting to the target base station.

5. An apparatus of a core network device serving a source base station, a target base station and a terminal device, wherein the apparatus is applicable to the Narrowband Internet of Things, and comprises:
   a processor, configured to start a first timer;
   a memory, configured to store downlink data for the terminal device being sent to the source base station during a duration of the first timer;
   a receiver, configured to receive a first indication message, wherein the first indication message is used to indicate that the terminal device completes a cell change or a cell reselection from the source base station to the target base station; and
   a transmitter, configured to:
      send the downlink data to the target base station,
   wherein the receiver is further configured to:
      receive feedback information used to indicate a status of receiving the downlink data by the terminal device, and
      based on the feedback information:
         the processor is further configured to delete the downlink data in response to the feedback information indicating that the terminal device has completely received the downlink data; or
         the transmitter is further configured to resend the downlink data to the target base station in response to the feedback information indicating that the terminal device did not completely receive the downlink data.

6. The apparatus according to claim 5, wherein the first indication message is sent after the target base station receives a radio resource control (RRC) connection re-establishment request sent by the terminal device, wherein the RRC connection re-establishment request carries a reason for connecting to the target base station.

7. An apparatus of a target base station, wherein the apparatus is applicable to a Narrowband Internet of Things system comprising the target base station, a source base station, a terminal device and a core network device, wherein the core network device serves both the source base station and the target base station, and wherein the apparatus comprises:
   a transmitter, configured to send a first indication message to the core network device, wherein the first indication message is used to indicate that the terminal device completes a cell change or a cell reselection from the source base station to the target base station; and
   a receiver configured to:
      receive downlink data from the core network device, wherein the downlink data is data meant for the terminal device and sent to the source base station that is stored by the core network device during a duration of a first timer, and wherein the first timer is initiated prior to sending the first indication message; and
      receive feedback information used to indicate a status of receiving the downlink data by the terminal device,
   wherein the transmitter is further configured to send the feedback information to the core network device, and
   wherein, based on the feedback information, the core network can delete the downlink data in response to the feedback information indicating that the terminal device has completely received the downlink data, or the core network can resending the downlink data to the target base station in response to the feedback information indicating that the terminal device did not completely received the downlink data.

8. The apparatus according to claim 7, wherein the receiver is further configured to receive a radio resource control (RRC) connection re-establishment request sent by the terminal device, wherein the RRC connection re-establishment request carries a reason for connecting to the target base station.

9. A non-transitory computer readable medium storing program code for use by a core network device for data processing for a Narrowband Internet of Things system comprising a terminal device, a source base station, a target base station and the core network device, wherein the core network device serves both the source base station and the target base station, and wherein the program code comprises instructions for:
   starting a first timer;
   storing downlink data for the terminal device being sent to the source base station during a duration of the first timer;
   receiving a first indication message, wherein the first indication message is used to indicate that the terminal device completes a cell change or a cell reselection from the source base station to the target base station;
   sending the downlink data stored during the duration of the first timer to the target base station in response to the terminal device establishing a connection to the target base station; and
   receiving feedback information used to indicate a status of receiving the downlink data by the terminal device, and based on the feedback information:
      deleting the downlink data in response to the feedback information indicating that the terminal device has completely received the downlink data; or
      resending the downlink data to the target base station in response to the feedback information indicating that the terminal device did not completely receive the downlink data.

10. The non-transitory computer readable medium according to claim 9, wherein obtaining the first indication message, comprises:
   receiving the first indication message that is sent by the target base station, wherein the first indication message is sent after the target base station receives a radio resource control (RRC) connection re-establishment request sent by the terminal device, wherein the RRC connection re-establishment request carries a reason for connecting to the target base station.

11. A non-transitory computer readable medium storing program code for use by a target base station for data processing for a Narrowband Internet of Things system comprising a terminal device, a source base station, the target base station and a core network device, wherein the core network device serves both the source base station and the target base station, and wherein the program code comprises instructions for:
   sending a first indication message to the core network device, wherein the first indication message is used to indicate that the terminal device completes a cell change or a cell reselection from the source base station to the target base station; and
   receiving downlink data from the core network device, wherein the downlink data is data meant for the terminal device and sent to the source base station that is stored by the core network device during a duration of a first timer, and wherein the first timer is initiated prior to sending the first indication message; and
   receiving feedback information used to indicate a status of receiving the downlink data by the terminal device; and
   sending the feedback information to the core network device,
   wherein the core network can delete the downlink data in response to the feedback information indicating that the terminal device has completely received the downlink data, or the core network can resending the downlink data to the target base station in response to the feedback information indicating that the terminal device did not completely receive the downlink data.

12. The non-transitory computer readable medium according to claim 11, wherein the program code further comprises:
   receiving a radio resource control (RRC) connection re-establishment request sent by the terminal device, wherein the RRC connection re-establishment request carries a reason for connecting to the target base station.

13. The method according to claim 1, wherein the cell change or the cell reselection is accomplished without the terminal device sending a measurement report.

14. The method according to claim 3, wherein the cell change or the cell reselection is accomplished without the terminal device sending a measurement report.

15. The apparatus according to claim 5, wherein the cell change or the cell reselection is accomplished without the terminal device sending a measurement report.

16. The apparatus according to claim 7, wherein the cell change or the cell reselection is accomplished without the terminal device sending a measurement report.

17. The non-transitory computer readable medium according to claim 9, wherein the cell change or the cell reselection is accomplished without the terminal device sending a measurement report.

18. The non-transitory computer readable medium according to claim 11, wherein the cell change or the cell reselection is accomplished without the terminal device sending a measurement report.

* * * * *